(12) United States Patent
Ostlie

(10) Patent No.: US 9,694,848 B1
(45) Date of Patent: Jul. 4, 2017

(54) HIGH PERFORMANCE STEERING SYSTEM

(71) Applicant: Energy Performance Systems, Inc., Rogers, MN (US)

(72) Inventor: L. David Ostlie, Corcoran, MN (US)

(73) Assignee: Energy Performance Systems, Inc., Rogers, MN (US)

(*) Notice: Subject to any disclaimer, the term of this patent is extended or adjusted under 35 U.S.C. 154(b) by 0 days.

(21) Appl. No.: 14/694,561

(22) Filed: Apr. 23, 2015

(51) Int. Cl.
B62D 7/06 (2006.01)
B62D 3/02 (2006.01)

(52) U.S. Cl.
CPC ...... *B62D 7/06* (2013.01); *B62D 3/02* (2013.01)

(58) Field of Classification Search
CPC ... B62D 7/09; B62D 7/06; B62D 7/14; B62D 7/142; B62D 7/15; B62D 3/02; B60G 2200/322
USPC .......................................................... 280/92
See application file for complete search history.

(56) References Cited

U.S. PATENT DOCUMENTS

| | | | | |
|---|---|---|---|---|
| 1,432,237 A * | 10/1922 | Dutton | B62D 3/02 | 280/775 |
| 1,733,544 A * | 10/1929 | Langdon | B62D 13/04 | 280/103 |
| 3,669,466 A * | 6/1972 | Spence | B62D 3/02 | 180/409 |
| 4,463,821 A * | 8/1984 | Falamak | B62D 7/026 | 180/168 |
| 4,504,074 A * | 3/1985 | Smith | B62D 3/02 | 280/93.506 |
| 5,046,577 A * | 9/1991 | Hurlburt | B60G 9/02 | 180/266 |
| 5,299,821 A * | 4/1994 | Hurlburt | B60K 17/30 | 172/279 |
| 5,312,123 A | 5/1994 | Hurlburt | | |
| 5,476,150 A * | 12/1995 | Hurlburt | A01B 71/06 | 172/279 |
| 5,476,276 A | 12/1995 | Hurlburt | | |
| 5,769,180 A | 6/1998 | Momose | | |
| 5,836,415 A * | 11/1998 | Barrowman | B62D 9/00 | 180/266 |
| 6,116,645 A | 9/2000 | Benassi | | |
| 6,125,963 A * | 10/2000 | Staiger | B62D 7/09 | 180/408 |
| 7,125,027 B2 * | 10/2006 | Sap | B60G 9/02 | 280/124.11 |

(Continued)

*Primary Examiner* — Karen Beck
(74) *Attorney, Agent, or Firm* — Mauriel Kapouytian Woods LLP; Michael Mauriel

(57) ABSTRACT

A High Performance Steering System for amplifying the turning motion of an axle as the turning motion is applied to wheels or tracks at the outer ends of the axle. The present invention generally includes a support member such as an axle which is secured underneath the frame of a vehicle such as a garden tractor or automobile. The support member includes a fixed post and an outer post for each wheel that is steered. Wheels or tracks are connected to the outer posts, such as by mounts. Rotation of the support member imparts forces through sprockets, gears, pulleys, tie rod linkages, or the like to amplify the turning motion of the support member as it is applied to the outer post. The amount of such amplification of turning motion between the support member and outer posts may be varied with differing size ratios of the sprockets, gears, or pulleys.

24 Claims, 23 Drawing Sheets

(56) References Cited

U.S. PATENT DOCUMENTS

| | | | | |
|---|---|---|---|---|
| 7,237,629 B1* | 7/2007 | Bland | ............... | B62D 7/08 |
| | | | | 180/6.24 |
| 7,690,685 B2* | 4/2010 | Sasaoka | ............ | B62D 3/02 |
| | | | | 280/513 |
| 7,735,845 B2 | 6/2010 | Snow | | |
| 8,152,183 B1 | 4/2012 | Bell | | |
| 8,851,489 B2 | 10/2014 | Balboni | | |
| 9,114,827 B2* | 8/2015 | Burns, Jr. | ............ | B62D 3/02 |
| 2004/0080134 A1* | 4/2004 | Sap | ............ | B60G 9/02 |
| | | | | 280/124.114 |
| 2007/0284839 A1* | 12/2007 | Sasaoka | ............ | B62D 3/02 |
| | | | | 280/93.502 |
| 2012/0280467 A1* | 11/2012 | Walther | ............ | B62K 5/023 |
| | | | | 280/263 |
| 2015/0008653 A1* | 1/2015 | Burns, Jr. | ............ | B62D 3/02 |
| | | | | 280/93.512 |
| 2015/0076780 A1* | 3/2015 | Smith | ............ | B62K 5/003 |
| | | | | 280/87.041 |
| 2016/0214644 A1* | 7/2016 | Cmich | ............ | B62D 3/02 |

* cited by examiner

HIGH PERFORMANCE STEERING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

Field of the Invention

The present invention relates generally to a steering system and more specifically it relates to a High Performance Steering System for amplifying the turning motion of an axle as the turning motion is applied to wheels or tracks at the outer ends of the axle.

Description of the Related Art

Any discussion of the related art throughout the specification should in no way be considered as an admission that such related art is widely known or forms part of common general knowledge in the field.

Steering mechanisms have been in use for as long as humans have looked to vehicles to aid with transport or work. Whether using a bicycle or heavy-duty machinery, an axle is provided which is rotated in one of two directions. Other machines may use fixed axles and rotate or turn the wheels at the end of the axle, such as a car. Rotation of the axle will rotate wheels, tracks, or the like which are positioned at either end of the axle, but only to the degree the main axle is rotated, such as with a horse-drawn wagon. In such a manner, conventional steering mechanisms allow for a vehicle or the like to be turned by rotation of the main axle or the wheels at the end of a fixed axle, but not both.

However, in certain types of vehicles, it is preferable to have additional turning options other than the circular turning motions allowed by conventional steering mechanisms. Specifically, the wheels of vehicles using conventional prior art steering systems are pivoted between a limited range of motion due to limitations of the axle. It would be preferable for some vehicles, such as garden tractors, fork lifts, or tree harvesters for example, to have full range of motion of the wheels or tracks by simply turning both the wheels or tracks and the axle, so that those wheels or tracks may be oriented at right angles or the like which are not possible with conventional, prior art steering assemblies.

Because of the inherent problems with the related art, there is a need for a new and improved High Performance Steering System for amplifying the turning motion of an axle as the turning motion is applied to wheels or tracks at the outer ends of the axle.

BRIEF SUMMARY OF THE INVENTION

The invention generally relates to a steering system which includes a support member such as an axle which is secured underneath the frame of a vehicle such as a garden tractor. The support member includes a fixed post and a pair of outer posts at its respective first and second ends. Wheels or tracks are connected to the outer posts, such as by mounts. The support member may be rotated using various configurations, such as but not limited to pulleys, gears, sprockets, chains, or linear actuators such as a hydraulic cylinder. For example, if the support member is rotated 30 degrees, the invention causes the wheels or tracks to rotate 60 degrees for a total turn of 90 degrees (a 3:1 force transfer). The amount of such amplification of turning motion between the support member and outer posts may be varied with differing size ratios of the sprockets, gears, pulleys, or other linkages.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
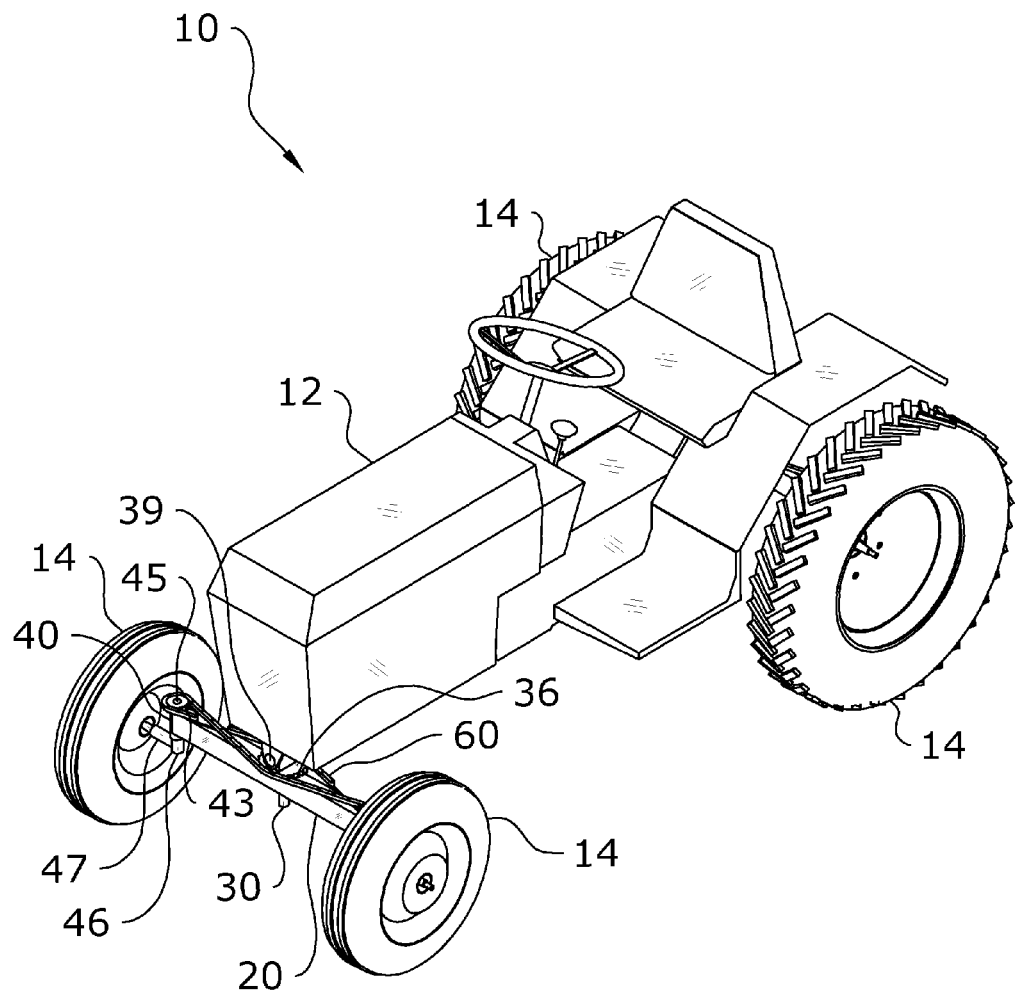
FIG. 1 is an upper perspective view of the sprocket embodiment of the present invention in use on a tractor with wheels.

A. Overview.

Turning now descriptively to the drawings, in which similar reference characters denote similar elements throughout the several views, FIGS. 1 through 23 illustrate a High Performance Steering System 10, which comprises a support member 20 such as an axle which is secured underneath the frame 13 of a vehicle 12 such as a garden tractor. The support member 20 includes a fixed post 30 and a pair of outer posts 40, 50 at its respective first and second ends 21, 22. Wheels 14 or tracks 15 are connected to the outer posts 40, 50, such as by mounts 47, 57. Rotation of the support member 20 is imparted through sprockets 36, 43, 53, gears 70, 80, 84, pulleys 86, 87, 88, tie rods, linear actuators, or the like to amplify turning motion of the support member 20 as it is applied to the outer posts 40, 50. The amount of such amplification of turning motion between the support member 20 and outer posts 40, 50 may be varied with differing size ratios of the sprockets 36, 43, 53 or gears 70, 80, 84.

B. Support Member.

As shown throughout the figures, the present invention includes a support member 20 which is secured underneath the frame 13 of a vehicle 12. The structure, shape, size, and orientation of the support member 20 may vary in different embodiments. For example, the support member 20 may be significantly larger for a heavy-duty vehicle 12 than for a smaller, more conventional vehicle 12.

The support member 20 will generally act as an axle for the wheels 14 or tracks 15 of the present invention. The support member 20 includes a first end 21 and a second end 22. The first end 21 is generally connected to a first wheel 14 or track 15 of the vehicle 12 and the second end 22 is generally connected to a second wheel 14 or track 15 of the vehicle 12.

A force transfer assembly, which may be comprised of either sprockets 36, 43, 53 and a linkage 60, a plurality of gears 70, 80, 84, a plurality of pulleys 86, 87, 88, or the like will generally be positioned on top of the support member 20 as shown in the figures. However, it should be appreciated that the adjustment assembly, regardless of the type of embodiment used, may also be positioned underneath the support member 20 in some embodiments of the present invention.

The support member 20, which extends horizontally in most embodiments, includes three vertical posts 30, 40, 50; a fixed post 30 at a mid-point between its first and second ends 21, 22, a first outer post 40 at its first end 21, and a second outer post 50 at its second end 22.

The support member 20 may include a central aperture 25 through which the fixed post 30 extends, with the support member 20 being pivotally or rotatably connected around the fixed post 30. The support member 20 may also include a first receiver portion 23 at its first end 21 in which the first outer post 40 is secured. The first receiver portion 23 will generally include an indentation within the first end 21 of the support member 20, such as the arc-shaped indentation shown in the figures. In some embodiments, the first receiver portion 23 may comprise an opening or aperture extending through the support member 20 near its first end 21.

The second end 22 of the support member 20 similarly includes a second receiver portion 24 in which the second outer post 50 is secured. The second receiver portion 24 will generally also include an indentation within the second end 22 of the support member 20, such as the arc-shaped indentation shown in the figures. In some embodiments, the second receiver portion 24 may comprise an opening or aperture extending through the support member 20 near its second end 22.

Figure 16:
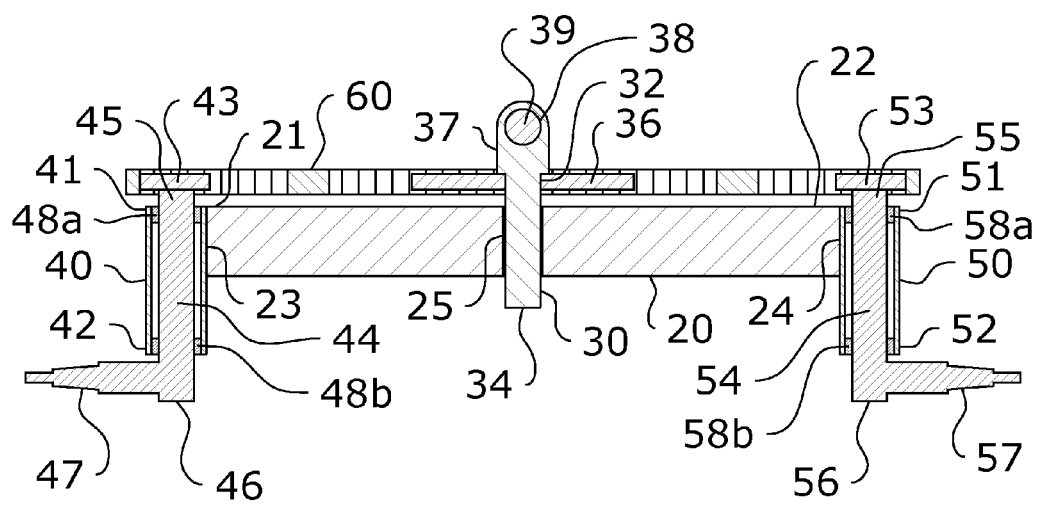
FIG. 16 is a sectional view of an embodiment of the present invention with bearings in its outer posts.

As best shown in FIG. 16, the fixed post 30 of the present invention generally extends through a central aperture 25 formed within the support member 20. The support member 20 will rotate or pivot about the fixed post 30 when the present invention is in use. The central aperture 25 will preferably be positioned at the mid-point between the first and second ends 21, 22 of the support member 20 as shown in the figures. This placement ensures that the support member 20 uniformly rotates in either direction.

The shape, size, and positioning of the central aperture 25 may vary in different embodiments, however. The fixed post 30 extends through the central aperture 25 in a manner which allows rotation without permitting excessive up-and-down movement of the fixed post 30 within the central aperture 25. The fixed post 30 may be frictionally secured within the central aperture 25 or, in some embodiments, a separate device may be utilized to effectuate rotation, such as a bearing.

The fixed post 30 includes an upper end 32 and a lower end 34. The central sprocket 36 or central gear 70 of the present invention is generally connected to or integrally formed with the upper end 32 of the fixed post 30. The lower end 34 of the fixed post 30 may be flush with the support member 20 or may extend downwardly therefrom as shown in the figures.

The support member 20 is generally connected to the frame 13 of a vehicle 12 at or near its mid-point. In a preferred embodiment as shown in the figures, the fixed post 30 of the present invention is connected to the frame 13 with the support member 20 rotatably connected around the fixed post 30. The upper end 32 of the fixed post 30 may thus include a central bracket 37. The central bracket 37 is generally secured directly on top of the central sprocket 36 or central gear 70 as shown in the figures.

The central bracket 37 may be comprised of various structures adapted to connect the support member 20 and fixed post 30 with the frame 13 of the vehicle 12. In a preferred embodiment, the central bracket 37 may include a tubular member having a bracket opening 38. An elongated pin 39 from the frame 13 of the vehicle 12 may extend through this bracket opening 38 to secure the central bracket 37 to the frame 13.

Using this configuration, the central bracket 37 and support member 20 are able to "see-saw" or pivot up-and-down about the central point of the support member 20. This configuration permits the vehicle 12 to safely traverse uneven surfaces by allowing the wheels 14 or tracks 15 on one side of the vehicle 12 to be at a different vertical level than the wheels 14 or tracks 15 on the other side of the vehicle 12.

Figure 2:
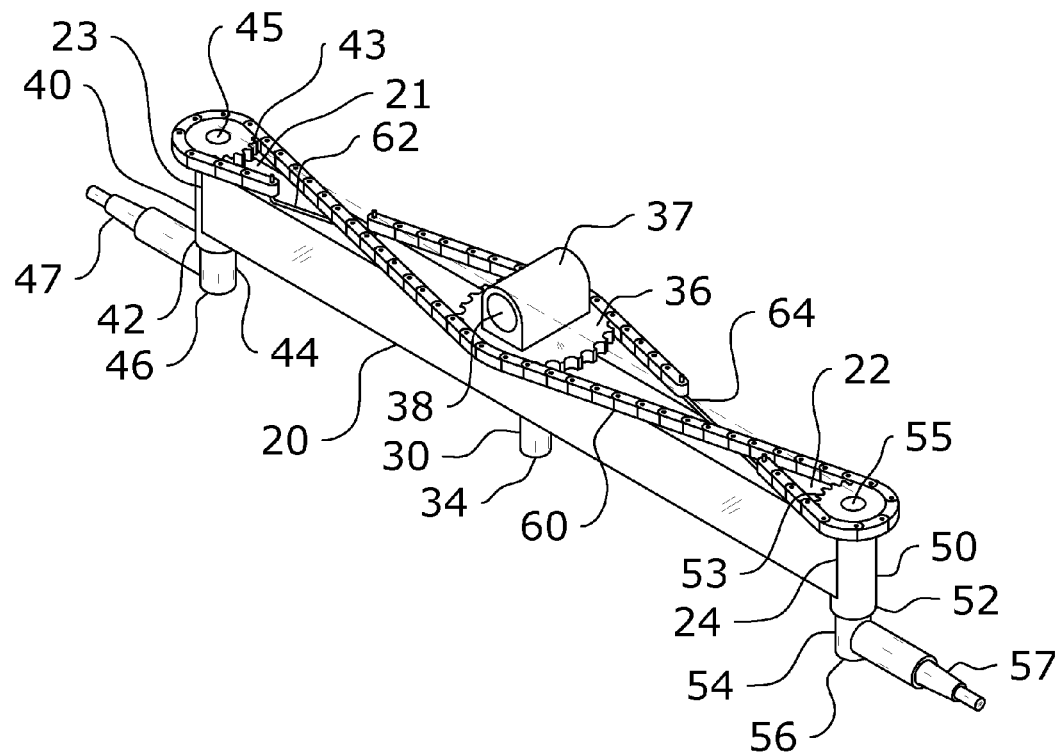
FIG. 2 is an upper perspective view of the sprocket embodiment of the present invention in a straight orientation.
Figure 3:
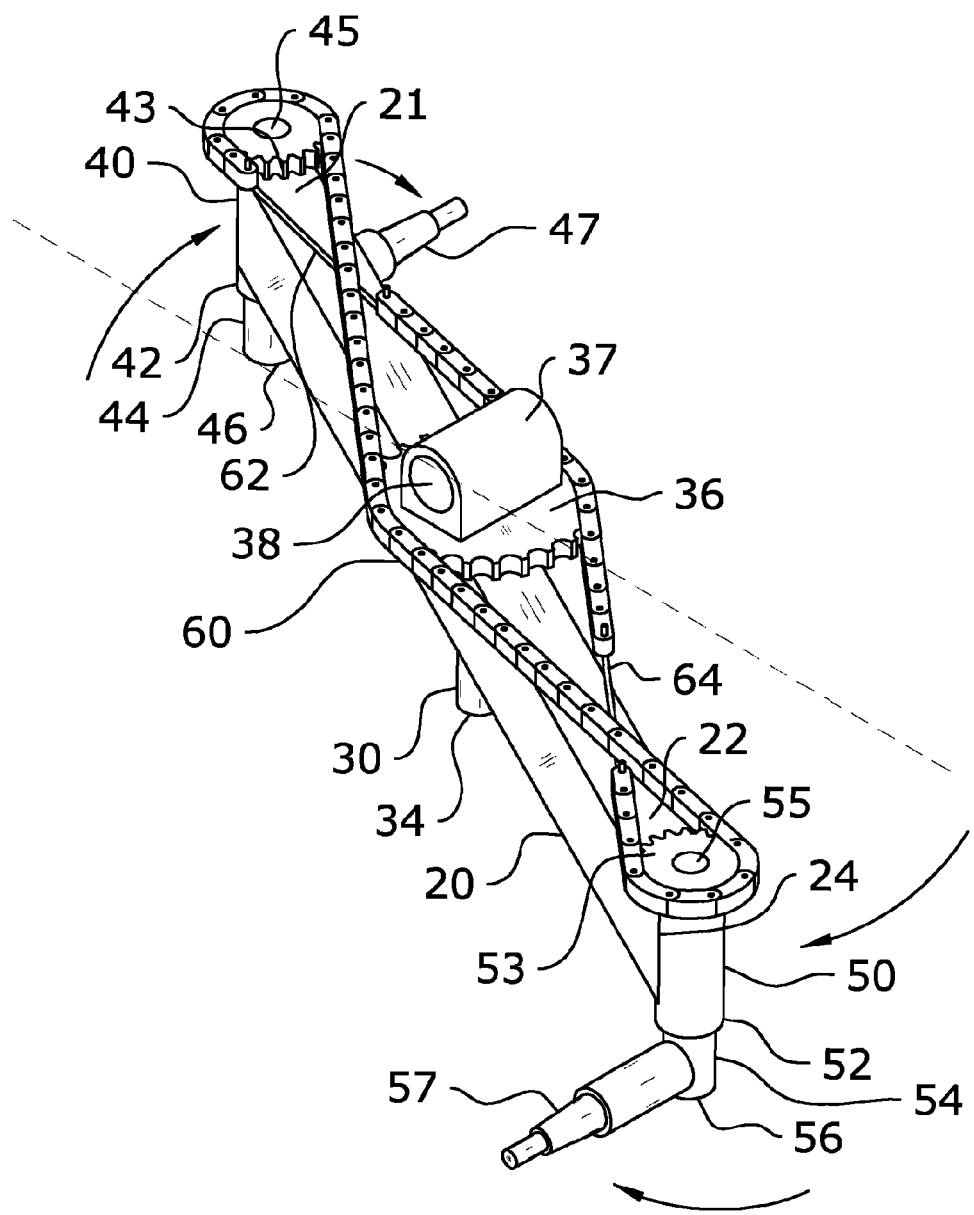
FIG. 3 is an upper perspective view of the sprocket embodiment of the present invention in a turned orientation.

The first outer post 40 is best shown in FIGS. 2-3. The first outer post 40 is generally fixedly secured to the first end 21 of the support member 20, with a first rotator shaft 44 being rotatably positioned within the first outer post 40. In some embodiments, the first rotator shaft 44 may be omitted and the first outer post 40 may itself rotate or pivot with respect to the first end 21 of the support member 20. In a preferred embodiment as shown, the first outer post 40 is either connected to or integrally formed with the first end 21 of the support member 20 in a fixed manner, with all rotation or pivoting motion being performed by the nested first rotator shaft 44.

The first outer post 40 includes an upper end 41 and a lower end 42. In embodiments in which the first outer post 40 rotates itself, the upper end 41 of the first outer post 40 is connected directly to the first outer sprocket 43 or first outer gear 80. In embodiments in which a nested first rotator shaft 44 is utilized, the upper end 45 of the first rotator shaft 44 extends out of the upper end 41 of the first outer post 40 as shown in the figures. The lower end 42 of the first outer post 40 is either flush or extends below the support member 20 itself. In embodiments using a first rotator shaft 44, the lower end 46 of the first rotator shaft 44 may extend out of the lower end 42 of the first outer post 40.

The first rotator shaft 44 is best shown in FIG. 16. As previously mentioned, the first rotator shaft 44 is utilized in a preferred embodiment. However, alternate embodiments may instead merely utilize a rotating or pivoting first outer post 40 and thus completely omit the first rotator shaft 44.

In a preferred embodiment, the first rotator shaft 44 comprises an elongated member which is nested within the first outer post 40 such that the first rotator shaft 44 rotates or pivots within the first outer post 40. The first rotator shaft 44 includes an upper end 45 and a lower end 46, wherein the upper end 45 extends out of and above the upper end 41 of the first outer post 40. The lower end 46 of the first rotator shaft 44 extends out of the lower end 42, with the first mount 47 of the present invention extending outwardly from the lower end 42 of the first rotator shaft 44.

The first rotator shaft 44 freely rotates or pivots within the first outer post 40. This may be accomplished with a number of methods or objects. In one embodiment, the first rotator shaft 44 may be frictionally secured within the first outer post 40 to allow such rotational movement. In a preferred embodiment as shown in FIG. 16, one or more first bearings 48 may be utilized to allow the first rotator shaft 44 to smoothly rotate within the first outer post 40. In one such preferred embodiment, the first of the first bearings 48a is positioned near the upper end 45 of the first rotator shaft 44 and the upper end 41 of the first outer post 40. A second of the first bearings 48b is similarly positioned near the lower end 46 of the first rotator shaft 44 and the lower end 42 of the first outer post 40.

As best shown in FIGS. 2-3, a first mount 47 extends perpendicularly with respect to the first outer post 40. A wheel 14, track 15, or other structure of the vehicle 12 is mounted on the first mount 47 such as shown in FIG. 1. The first mount 47 may extend through a wheel 14 or be directly connected thereto.

The positioning of the first mount 47 may vary in different embodiments of the present invention. In a preferred embodiment, the first mount 47 comprises an elongated member which extends outwardly from the lower end 46 of the first rotator shaft 44 after it exits the lower end 42 of the first outer post 40. The first mount 47 extends perpendicularly with respect to the first rotator shaft 44 and is fixedly secured or integrally formed therewith such that the first mount 47 rotates with the first rotator shaft 44. In embodiments in which the first outer post 40 itself rotates, the first mount 47 is fixedly secured to or integrally formed with the first outer post 40 in a perpendicular manner such that when the first outer post 40 rotates, the first mount 47 rotates with it. Rotation or pivoting of the first mount 47 will effectuate rotation of the wheel 14 or track 15 connected thereto.

The second outer post 50 is best shown in FIGS. 2-3. The second outer post 50 is generally fixedly secured to the second end 22 of the support member 20, with a second rotator shaft 54 being rotatably positioned within the second outer post 50. In some embodiments, the second rotator shaft 54 may be omitted and the second outer post 50 may itself rotate or pivot with respect to the second end 22 of the support member 20. In a preferred embodiment as shown, the second outer post 50 is either connected to or integrally formed with the second end 22 of the support member 20 in a fixed manner, with all rotation or pivoting motion being performed by the nested second rotator shaft 54.

The second outer post 50 includes an upper end 51 and a lower end 52. In embodiments in which the second outer post 50 rotates itself, the upper end 51 of the second outer post 50 is connected directly to the second outer sprocket 53 or second outer gear 84. In embodiments in which a nested second rotator shaft 54 is utilized, the upper end 55 of the second rotator shaft 54 extends out of the upper end 51 of the second outer post 50 as shown in the figures. The lower end 52 of the second outer post 50 is either flush or extends below the support member 20 itself. In embodiments using a second rotator shaft 54, the lower end 56 of the second rotator shaft 54 may extend out of the lower end 52 of the second outer post 50.

The second rotator shaft 54 is best shown in FIG. 16. As previously mentioned, the second rotator shaft 54 is utilized in a preferred embodiment. However, alternate embodiments may instead merely utilize a rotating or pivoting second outer post 50 and thus completely omit the second rotator shaft 54.

In a preferred embodiment, the second rotator shaft 54 comprises an elongated member which is nested within the second outer post 50 such that the second rotator shaft 54 rotates or pivots within the second outer post 50. The second rotator shaft 54 includes an upper end 55 and a lower end 56, wherein the upper end 55 extends out of and above the upper end 51 of the second outer post 50. The lower end 56 of the second rotator shaft 54 extends out of the lower end 52, with the second mount 57 of the present invention extending outwardly from the lower end 52 of the second rotator shaft 54.

The second rotator shaft 54 freely rotates or pivots within the second outer post 50. This may be accomplished with a number of methods or objects. In one embodiment, the second rotator shaft 54 may be frictionally secured within the second outer post 50 to allow such rotational movement. In a preferred embodiment as shown in FIG. 16, one or more second bearings 58 may be utilized to allow the second rotator shaft 54 to smoothly rotate within the second outer post 50. In one such preferred embodiment, a first of these second bearings 58a is positioned near the upper end 55 of the second rotator shaft 54 and the upper end 51 of the second outer post 50. A second of these second bearings 58b is similarly positioned near the lower end 56 of the second rotator shaft 54 and the lower end 52 of the second outer post 50.

As best shown in FIGS. 2-3, a second mount 57 extends perpendicularly with respect to the second outer post 50. A wheel 14, track 15, or other structure of the vehicle 12 is mounted on the second mount 57 such as shown in FIG. 1. The second mount 57 may extend through a wheel 14 or be directly connected thereto.

The positioning of the second mount 57 may vary in different embodiments of the present invention. In a preferred embodiment, the second mount 57 comprises an elongated member which extends outwardly from the lower end 56 of the second rotator shaft 54 after it exits the lower end 52 of the second outer post 50. The second mount 57 extends perpendicularly with respect to the second rotator shaft 54 and is fixedly secured or integrally formed therewith such that the second mount 57 rotates with the second rotator shaft 54. In embodiments in which the second outer post 50 itself rotates, the second mount 57 is fixedly secured to or integrally formed with the second outer post 50 in a perpendicular manner such that when the second outer post 50 rotates, the second mount 57 rotates with it. Rotation or pivoting of the second mount 57 will effectuate rotation of the wheel 14 or track 15 connected thereto.

Figure 23:
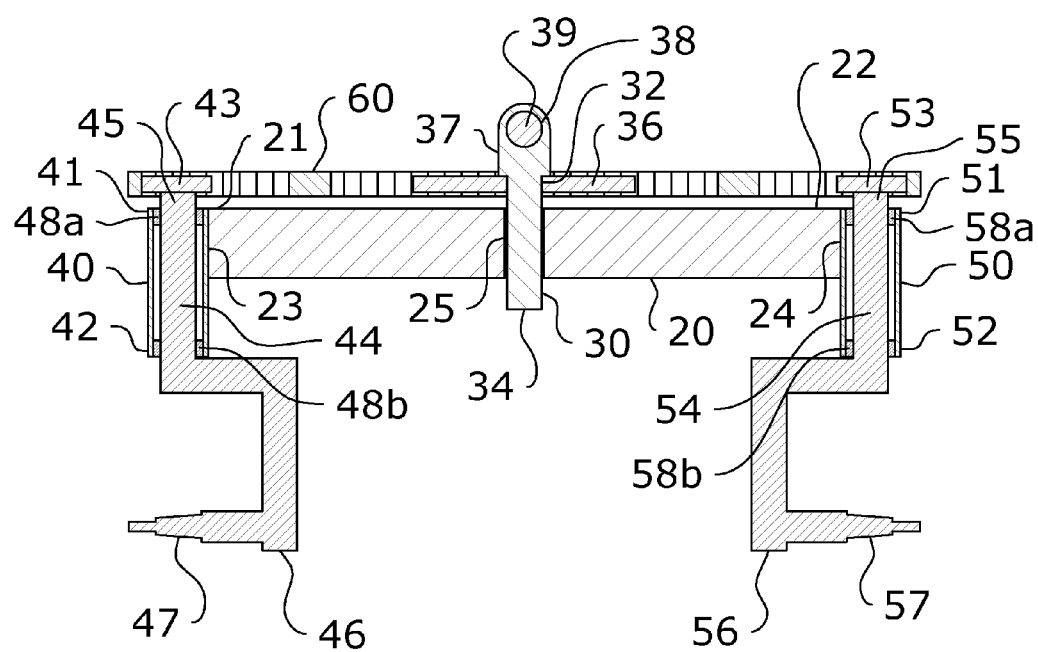
FIG. 23 is a frontal view of an alternate embodiment of the wheel/track mounts of the present invention.

FIG. 23 illustrates an alternate configuration for the mounts 47, 57 in which the rotator shafts 44, 54 are configured to extend inwardly at a right angle and then downwardly at a right angle. This configuration aids with stability and utilizes mounts 47, 57 which extend outwardly from the distal end of the downward projection of the rotator shafts 44, 54 as shown in FIG. 23.

C. Force Transfer Assembly.

The present invention is adapted to "amplify, multiply, or add" wheel 14 or track 15 rotation due to implementation of an axle. Thus, a force transfer assembly is provided which rotates either the outer posts 40, 50 or rotator shafts 44, 54 with respect to the support member 20 as the support member 20 is rotated about the fixed post 30. The turning force applied to the support member 20 is transferred to the 40, 50 or rotator shafts 44, 54 via the force transfer assembly.

There are a wide range of embodiments of the force transfer assembly that may be used with the present invention. The force transfer assembly should be adapted to cause the wheels 14 or tracks 15 to rotate at greater angles than the support member 20 itself is rotated. While the figures and description teach the use of sprockets, gears, and pulleys, other structures may be utilized to effectuate the same functionality. For example, cables, solid linkages, tie rods, and the like may also be utilized for the force transfer assembly.

i. Sprocket and Linkage Assembly.

An embodiment of the force transfer assembly which utilizes sprockets 36, 43, 53 in combination with a linkage 60 is shown in FIGS. 1-8. In this embodiment, the present invention includes a central sprocket 36, a first outer sprocket 43, and a second outer sprocket 53. Each of these sprockets 36, 43, 53 is linked together by a linkage 60 such as a chain or the like.

As best shown in FIG. 2, the central sprocket 36 is positioned at the mid-point between the first end 21 and the second end 22 of the support member 20. The central sprocket 36 generally comprises a circular member having gears, projections, or indentations along its outer circumference. These gears, projections, or indentations are adapted to receive the linkage 60 of the present invention.

The central sprocket 36 is preferably positioned directly at the upper end 32 of the fixed post 30. The central sprocket 36 may be connected to the upper end 32 of the fixed post 30 or may be integrally formed therewith. In embodiments in which the central sprocket 36 is connected to the fixed post 30, the central sprocket 36 may be removed for service or replacement. The central bracket 37 of the present invention generally rests on top of the central sprocket 36 as best shown in FIG. 2.

As shown in FIG. 2, the outer sprockets 43, 53 are positioned at the first end 21 and second end 22 of the support member 20, respectively. The first outer sprocket 43 is positioned at or near the first end 21 of the support member 20 and the second outer sprocket 53 is positioned at or near the second end 22 of the support member 20. The outer sprockets 43, 53 each comprise a circular member having gears, projections, or indentations along its outer circumference. These gears, projections, or indentations are adapted to receive the linkage 60 of the present invention.

The first outer sprocket 43 is preferably positioned directly at the upper end 41 of the first outer post 40 and the second outer sprocket 53 is preferably positioned directly at the upper end 51 of the second outer post 50 as shown in FIG. 2. The outer sprockets 43, 53 may be connected to the outer posts 40, 50 or may be integrally formed therewith. The outer sprockets 43, 53 may be removable for service or replacement.

The size ratio between the central sprocket 36 and the outer sprockets 43, 53 may vary in different embodiments of the present invention. The central sprocket 36 will generally be larger than the outer sprockets 43, 53. The first outer sprocket 43 will generally be the same size as the second outer sprocket 53. In the figures, the central sprocket 36 is shown as being approximately twice the size of each of the outer sprockets 43, 53, though other size ratios may be utilized. Some applications may require equal-sized sprockets 36, 43, 53 where a 90 degree turning radius can be affected by turning the axle 45 degrees and the wheels 14 or tracks 15 45 degrees. Their respective sizes may be adjusted to effectuate different ratios between the turning motion of the support member 20 and that of the wheels 14 or tracks 15.

As shown throughout the figures, a linkage 60 is provided which connects between the sprockets 30, 43, 53 of the present invention. The linkage 60 may comprise any number of elongated members which link together the sprockets 30, 43, 53. By way of example and without any limitation whatsoever, the linkage 60 could comprise a cable, chain, rope, tie, or a roller chain (as is shown in the figures).

The linkage 60 may include one or more cross portions 62, 64 which allow the linkage 60 to cross over itself without impeding motion of the linkage 60. The cross portions 62, 64 thus comprise a modified portion of the linkage 60 to allow free movement in areas of crossover. In a preferred embodiment as shown in the figures, the linkage 60 crosses over itself at two positions; a first cross portion 62 and a second cross portion 64. More or less cross portions 62, 64 may be utilized if necessary for any particular embodiment.

ii. Gear Assembly.

An embodiment of the force transfer assembly which utilizes gears 70, 80, 84 instead of sprockets 36, 43, 53 is shown in FIGS. 9-15. In this embodiment, the present invention includes a central gear 70, a first outer gear 80 linked to a first portion 71 of the central gear 70, and a second outer gear 84 linked to a second portion 73 of the central gear 70. These gears 70, 80, 84 act together to amplify turning motion of the support member 20 as it is applied to wheels 14 or tracks 15 at its outer ends 21, 22.

Figure 10:
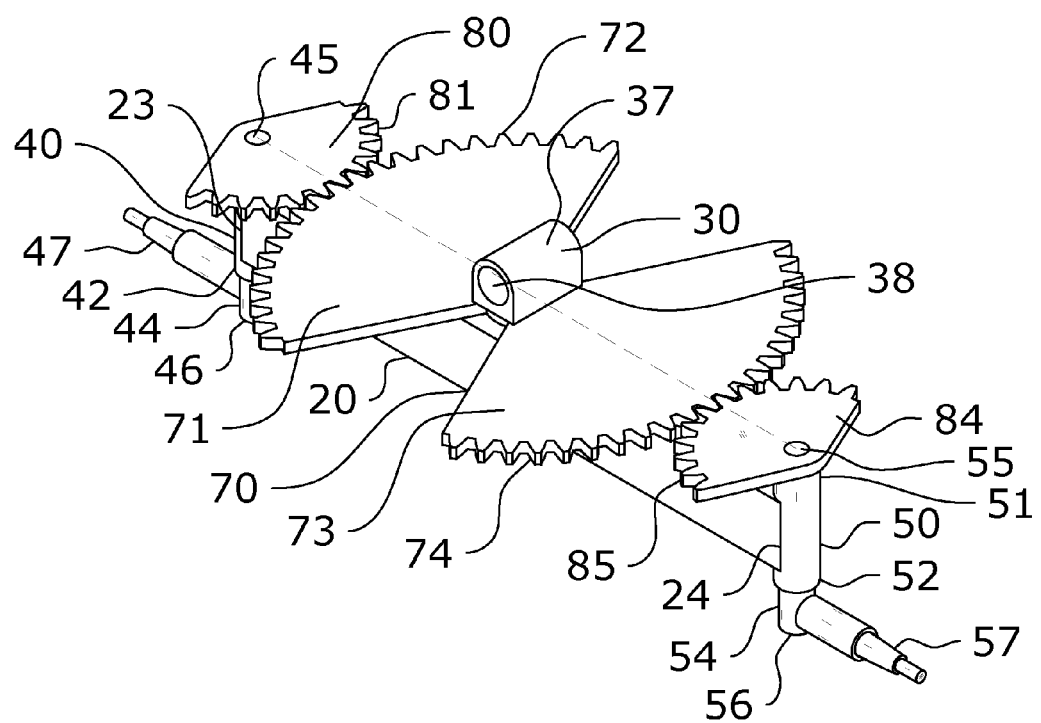
FIG. 10 is an upper perspective view of the gear embodiment of the present invention in a straight orientation.

As shown in FIG. 10, this embodiment of the present invention includes a central gear 70 which is positioned at a mid-point of the support member 20 between its two ends 21, 22. The central gear 70 is preferably connected to or integrally formed with the upper end 32 of the fixed post 30. The central gear 70 may be removable in some embodiments for ease of service or repair. The central bracket 37 of the present invention will generally rest on top of the central gear 70.

The structure of the central gear 70 may vary. In some embodiments, a standard circular gear may be utilized. In a preferred embodiment as best shown in FIG. 10, the central gear 70 will comprise a first portion 71 on its first side, a second portion 73 on its second side, and a central portion 75 which links the first and second portions 71, 73. The overall shape, configuration, and placement of the central gear 70 may vary in different embodiments.

The first portion 71 of the central gear 70 comprises an arc-shaped member which extends away from the central portion 75 toward the first side 21 of the support member 20. The first portion 71 of the central gear 70 includes a first portion gear edge 72 which includes indentations or projections which mesh with the first outer gear edge 81 of the first outer gear 80.

The second portion 73 of the central gear 70 comprises an arc-shaped member which extends away from the central portion 75 toward the second side 22 of the support member 20, in the opposite direction as the first portion 71. The second portion 73 of the central gear 70 includes a second portion gear edge 74 which includes indentations or projections which mesh with the second outer gear edge 85 of the second outer gear 84.

As best shown in FIG. 10, a first outer gear 80 is positioned at or near the first end 21 of the support member 20 and a second outer gear 84 is positioned at or near the second end 22 of the support member 20. The first outer gear 80 is preferably connected to or integrally formed with the upper end 41 of the first outer post 40. The second outer gear 80 is preferably connected to or integrally formed with the upper end 51 of the second outer post 50. Each of the outer gears 80, 84 may be removable in some embodiments to aid in service or replacement.

Figure 11:
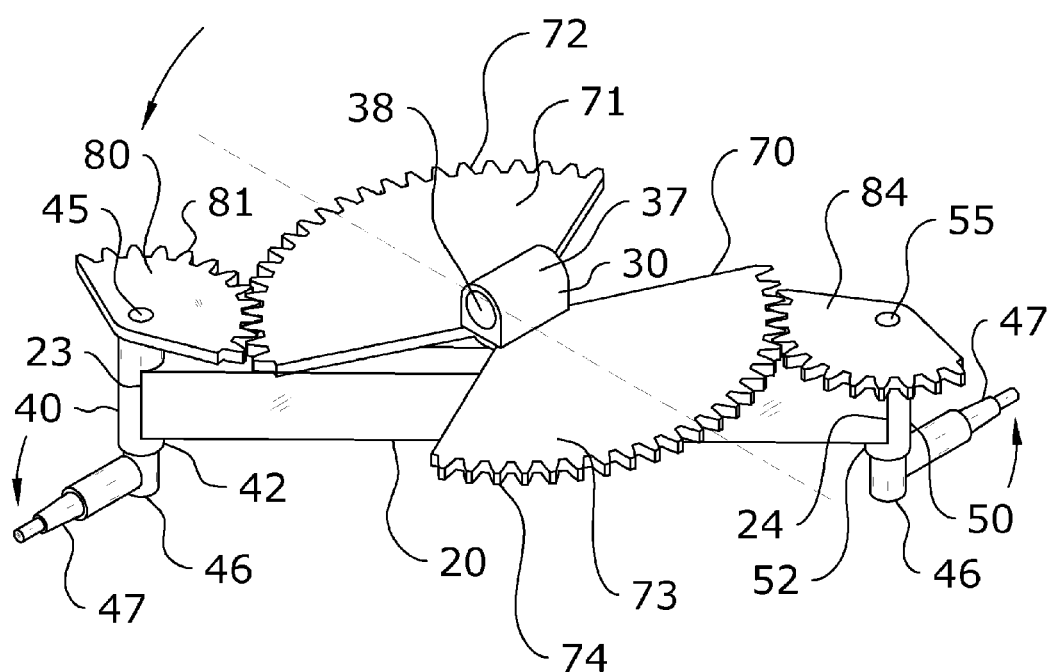
FIG. 11 is an upper perspective view of the gear embodiment of the present invention in a turned orientation.

The structure, positioning, and orientation of the outer gears 80, 84 may vary in different embodiments. Preferably, each of the outer gears 80, 84 comprises an arc-shape, with the "arc" of each outer gear 80, 84 facing inwards. The first outer gear 80 includes a first outer gear edge 81 which faces inwardly toward the central gear 70. The second outer gear 84 similarly includes a second outer gear edge 85 which faces inwardly toward the central gear 70. The first outer gear edge 81 of the first outer gear 80 meshes with the first portion gear edge 72 of the central gear 70 while the second outer gear edge 85 of the second outer gear 84 meshes with the second portion gear edge 74 of the central gear 70 as shown in FIGS. 10-11.

The size ratio between the central gear 70 and the outer gears 80, 84 may vary in different embodiments of the present invention. The central gear 70 will generally be larger than the outer gears 80, 84. The first outer gear 80 will generally be the same size as the second outer gear 84. In the figures, the central gear 70 is shown as comprising approximately twice the size of each of the outer gears 80, 84, though other ratios may be utilized. Some applications may require equal-sized gears 70, 80, 84 where a 90 degree turning radius can be affected by turning the axle 45 degrees and the wheels 14 or tracks 15 45 degrees. Their respective sizes may be adjusted to effectuate different ratios between the turning motion of the support member 20 and that of the wheels 14 or tracks 15.

iii. Pulley Assembly.

Figure 17:
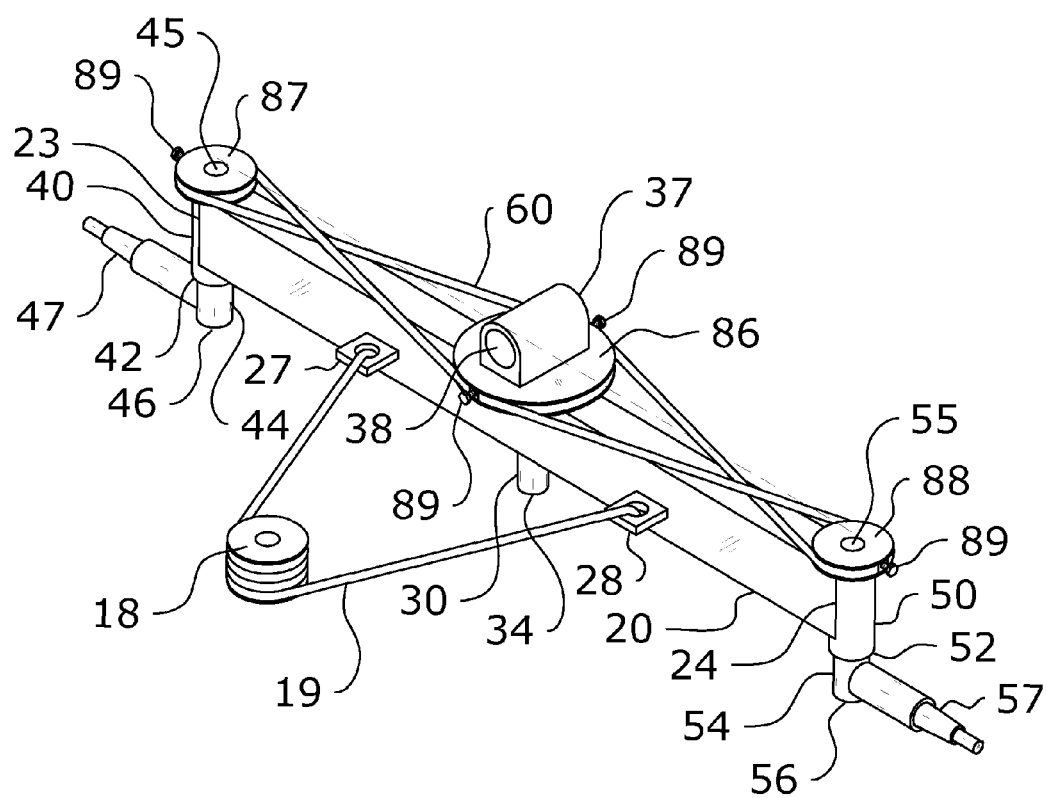
FIG. 17 is an upper perspective view of the pulley embodiment of the present invention.
Figure 18:
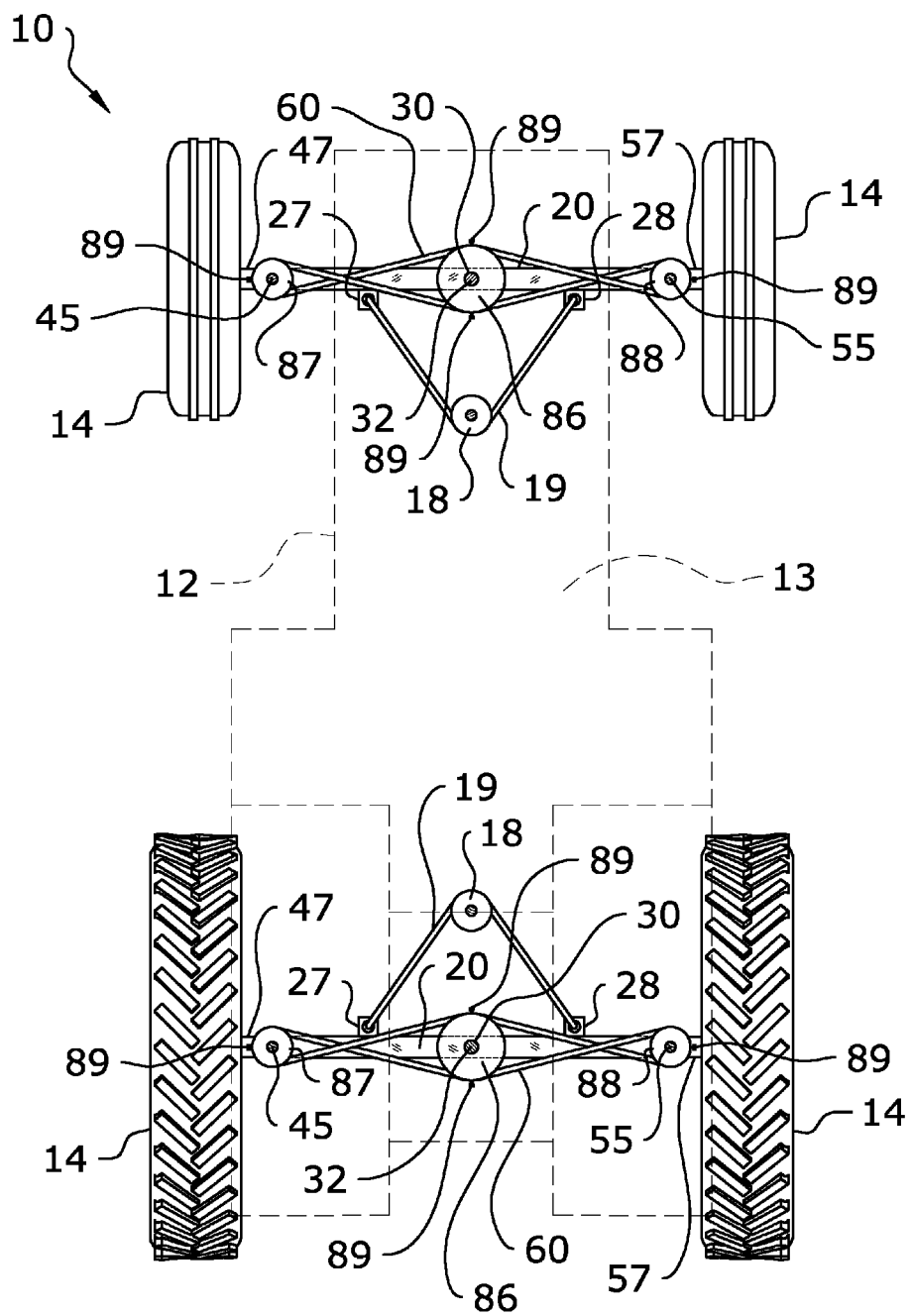
FIG. 18 is a top view of the pulley embodiment of the present invention with wheels with the support member in a straight orientation.
Figure 19:
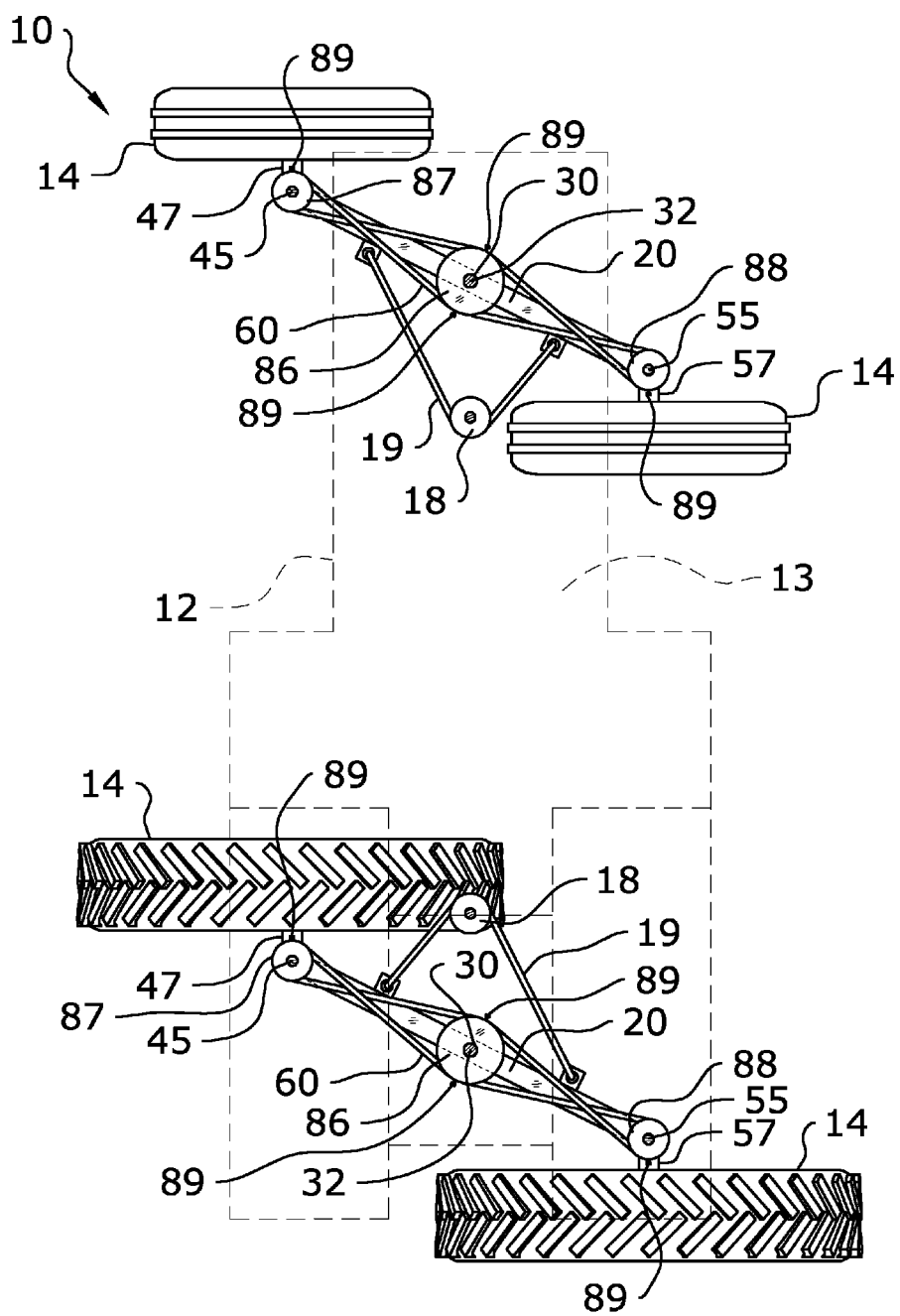
FIG. 19 is a top view of the pulley embodiment of the present invention with wheels with the support member in a turned orientation.

An embodiment of the force transfer assembly which utilizes pulleys 86, 87, 88 in combination with a linkage 60 is shown in FIGS. 17-19. In this embodiment, the present invention includes a central pulley 86, a first outer pulley 87, and a second outer pulley 88. Each of these pulleys 86, 87, 88 is linked together by a linkage 60 such as a cable or the like.

As best shown in FIG. 17, the central pulley 86 is positioned at the mid-point between the first end 21 and the second end 22 of the support member 20. The central pulley 86 generally comprises a circular member having a groove or other receiving portion for the linkage 60 along its outer circumference.

The central pulley 86 is preferably positioned directly at the upper end 32 of the fixed post 30. The central pulley 86 may be connected to the upper end 32 of the fixed post 30 or may be integrally formed therewith. In embodiments in which the central pulley 86 is connected to the fixed post 30, the central pulley 86 may be removed for service or replacement. The central bracket 37 of the present invention generally rests on top of the central pulley 86 as best shown in FIG. 17.

As shown in FIG. 17, the outer pulleys 87, 88 are positioned at the first end 21 and second end 22 of the support member 20, respectively. The first outer pulley 87 is positioned at or near the first end 21 of the support member 20 and the second outer pulley 88 is positioned at or near the second end 22 of the support member 20. The outer pulleys 87, 88 each comprise a circular member having a groove or other receiving portion for the linkage 60 along its outer circumference.

The first outer pulley 87 is preferably positioned directly at the upper end 41 of the first outer post 40 and the second outer pulley 88 is preferably positioned directly at the upper end 51 of the second outer post 50 as shown in FIG. 17. The outer pulleys 87, 88 may be connected to the outer posts 40, 50 or may be integrally formed therewith. The outer pulleys 87, 88 may be removable for service or replacement.

The size ratio between the central pulley 86 and the outer pulleys 87, 88 may vary in different embodiments of the present invention. The central pulley 86 will generally be larger than the outer pulleys 87, 88. The first outer pulley 87 will generally be the same size as the second outer pulley 88. In the figures, the central pulley 86 is shown as being approximately twice the size of each of the outer pulleys 87, 88, though other size ratios may be utilized. Some applications may require equal-sized pulleys 86, 87, 88 where a 90 degree turning radius can be affected by turning the axle 45 degrees and the wheels 14 or tracks 15 45 degrees. Their respective sizes may be adjusted to effectuate different ratios between the turning motion of the support member 20 and that of the wheels 14 or tracks 15.

As shown throughout the figures, a linkage 60 is provided which connects between the pulleys 86, 87, 88 of the present invention. The linkage 60 may comprise any number of elongated members which link together the pulleys 86, 87, 88. By way of example and without any limitation whatsoever, the linkage 60 could comprise a cable, chain, rope, tie, or a roller chain (as is shown in the figures).

To keep the linkage 60 secured to the pulleys 86, 87, 88, one or more pulley retainers 89 may be utilized as best shown in FIG. 17. Any type of pulley retainer 89 may be utilized, such as brackets, nuts, fasteners, clamps, and the like, so long as the linkage 60 is secured around the pulleys 86, 87, 88 such that the linkage 60 will not come loose or disconnected from the pulleys 86, 87, 88 during routine use.

iv. Alternate Embodiment.

Figure 20:
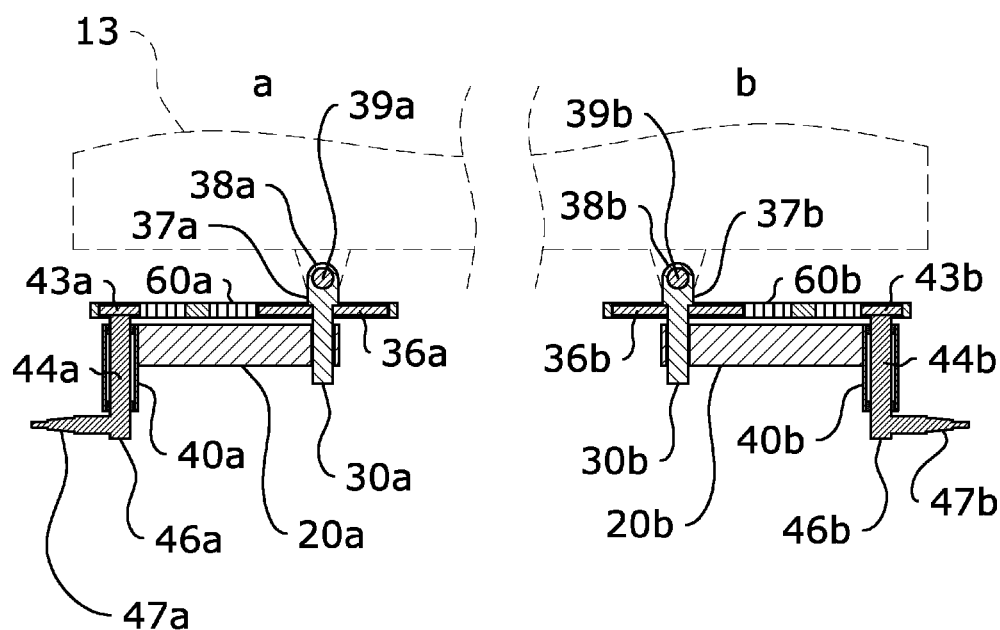
FIG. 20 is a frontal view of an alternate embodiment of the present invention for use with cars.
Figure 21:
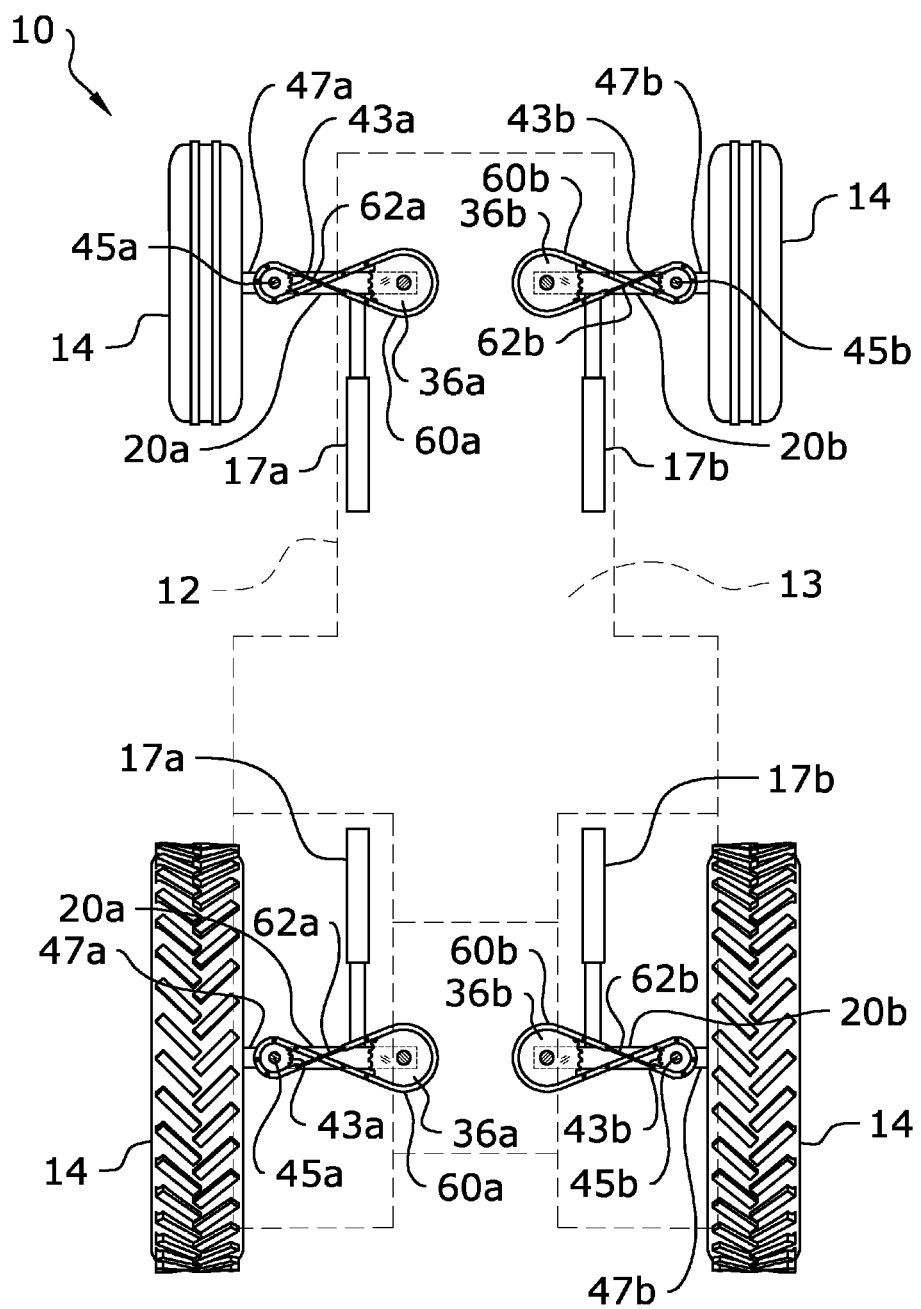
FIG. 21 is a top view of the alternate embodiment of FIG. 20 with the support members in a straight orientation.
Figure 22:
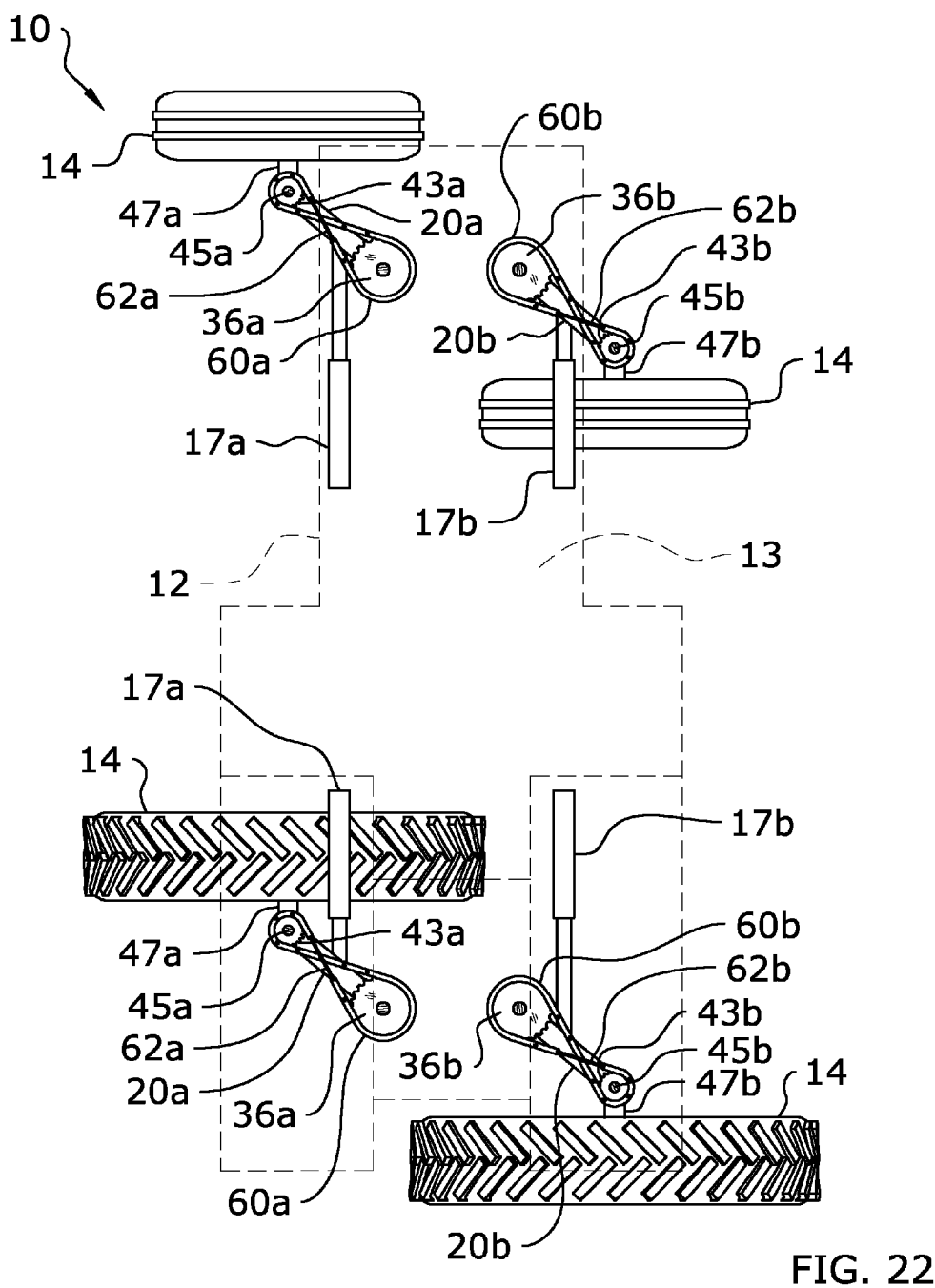
FIG. 22 is a top view of the alternate embodiment of FIG. 20 with the support members in a turned orientation.

FIGS. 20-22 illustrate an alternate embodiment of the present invention in which each wheel 14 or track 15 has its own force transfer assembly. This embodiment is suited in particular for vehicles with independent suspension steering systems. In such an alternate embodiment, a first wheel 14a will have its own force transfer assembly and a second wheel 14b will have its own force transfer assembly.

As best shown in FIG. 20, the first wheel 14a has a first support member 20a and the second wheel 14b has a second support member 20b. The inner end of the first support member 20a includes a first fixed post 30a with a first central bracket 37a having a first bracket opening 38a and a first pin 39a for securing the first central bracket 37a to the frame 13.

Continuing to reference FIG. 20, a first central sprocket 36a is shown at the inner end of the first support member 20a and a first outer post 40a is shown at the outer end of the first support member 20a. A first outer sprocket 43a is positioned on the first outer post 40a, preferably connected directly to the first rotator shaft 44a. The first mount 47a for the first wheel 14a is provided at the lower end 46a of the first rotator shaft 44a. A first linkage 60a is connected between the first fixed post 30a and the first outer sprocket 43a.

As can be seen on FIG. 20, a mirrored force transfer assembly is utilized for a second wheel 14b in the alternate embodiment. The inner end of the second support member 20b includes a second fixed post 30b with a second central bracket 37b having a second bracket opening 38b and a second pin 39b for securing the second central bracket 37b to the frame 13.

The second central sprocket 36b is shown at the inner end of the second support member 20b and the second outer post 40b is shown at the outer end of the second support member 20b. The second outer sprocket 43b is positioned on the second outer post 40b, preferably connected directly to the second rotator shaft 44b. The second mount 47b for the second wheel 14b is provided at the lower end 46b of the second rotator shaft 44b. A second linkage 60b is connected between the second fixed post 30b and the second outer sprocket 43b.

Although FIG. 20 merely shows two wheels 14a, 14b, it should be appreciated that the configuration of this embodiment may be repeated for additional wheels 14 or tracks 15 as needed for the particular vehicle 12 being used. Further, although FIG. 20 only shows sprockets 36, 43, this alternate embodiment may also utilize other types of force transfer assemblies, such as gears 70, 80 or pulleys 86, 87.

D. Operation of Preferred Embodiment.

Figure 4:
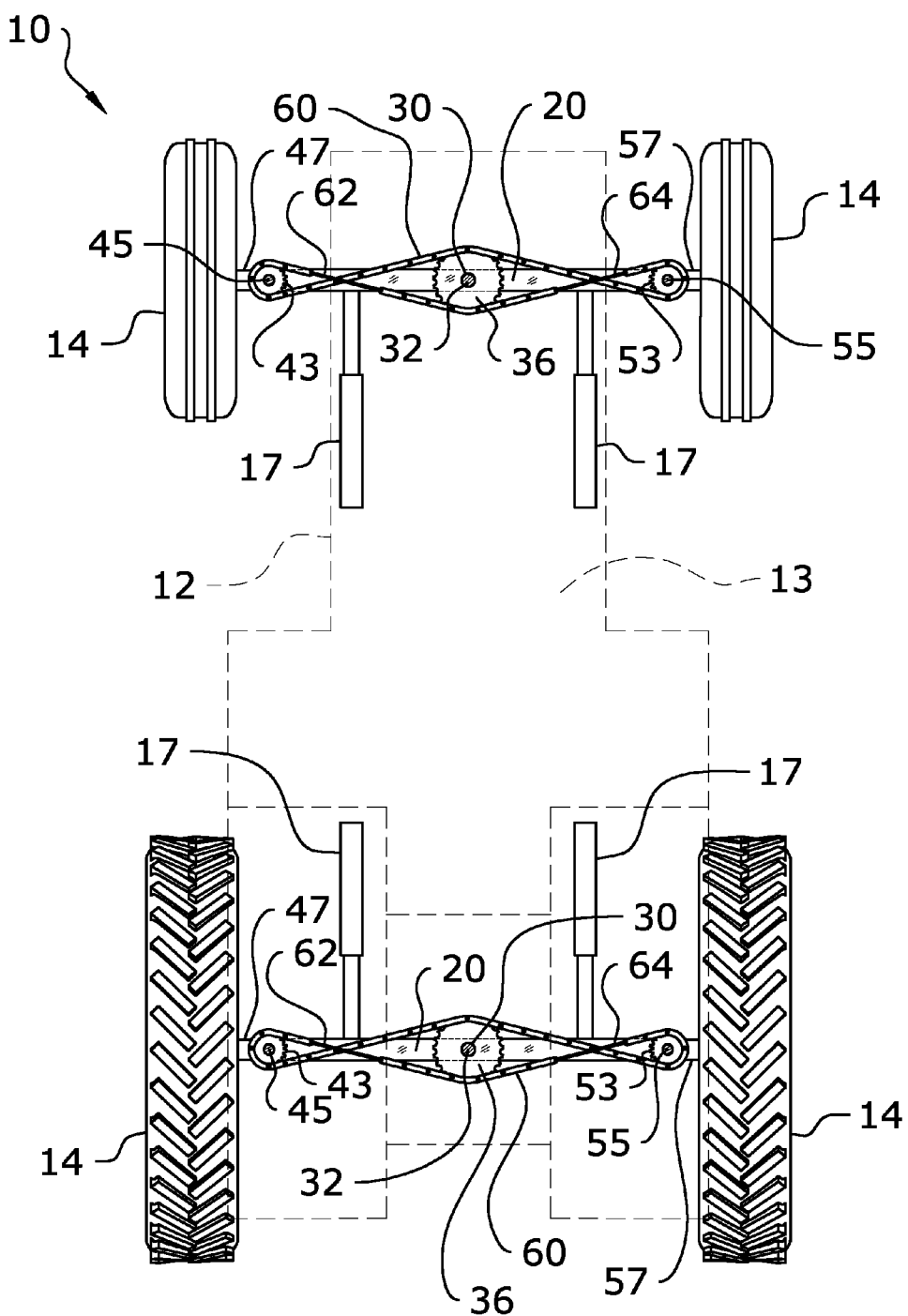
FIG. 4 is a top view of the sprocket embodiment of the present invention with wheels with the support member in a straight orientation.

FIGS. 2-5 and 7-8 illustrate exemplary operation of a sprocket embodiment of the present invention. FIGS. 2 and 4 illustrate an exemplary sprocket embodiment of the present invention in a straight configuration without any turning motion. To turn the wheels 14 or tracks 15, the support member 20 is first rotated or turned in one of two directions about a longitudinal axis.

This turning motion may be accomplished by a number of methods known in the art. For exemplary purposes, FIGS. 4, 5, 7, 8, 12, 13-15 illustrate hydraulic actuators 17 which are linked between the frame 13 of the vehicle 12 and the support member 20. An alternate steering configuration is shown in FIGS. 17-19. In such a configuration, a steering pulley 18 is provided around which a steering linkage 19 may be wound one or more times. As shown in FIGS. 18 and 19, the steering linkage 19 may be wound multiple times around the steering pulley 18 to effectuate a capstan-like configuration. The respective ends of the steering linkage 19 are connected to brackets 27, 28 on the support member 20. In the exemplary embodiment shown in the figures, a first bracket 27 connects to a first end of the steering linkage 19 and a second bracket 28 connects to the second end of the steering linkage 19.

Figure 5:
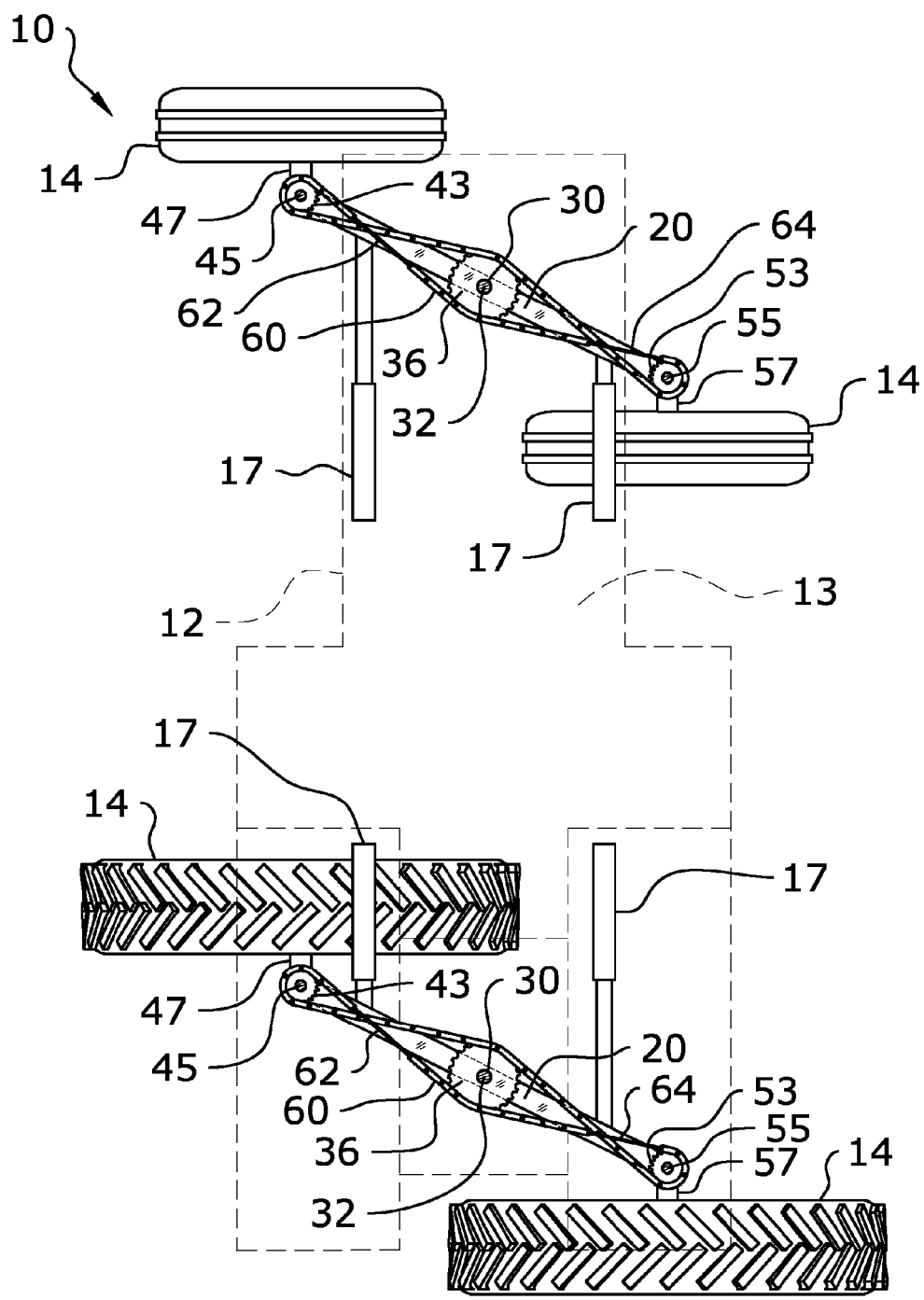
FIG. 5 is a top view of the sprocket embodiment of the present invention with wheels with the support member in a turned orientation.
Figure 6:
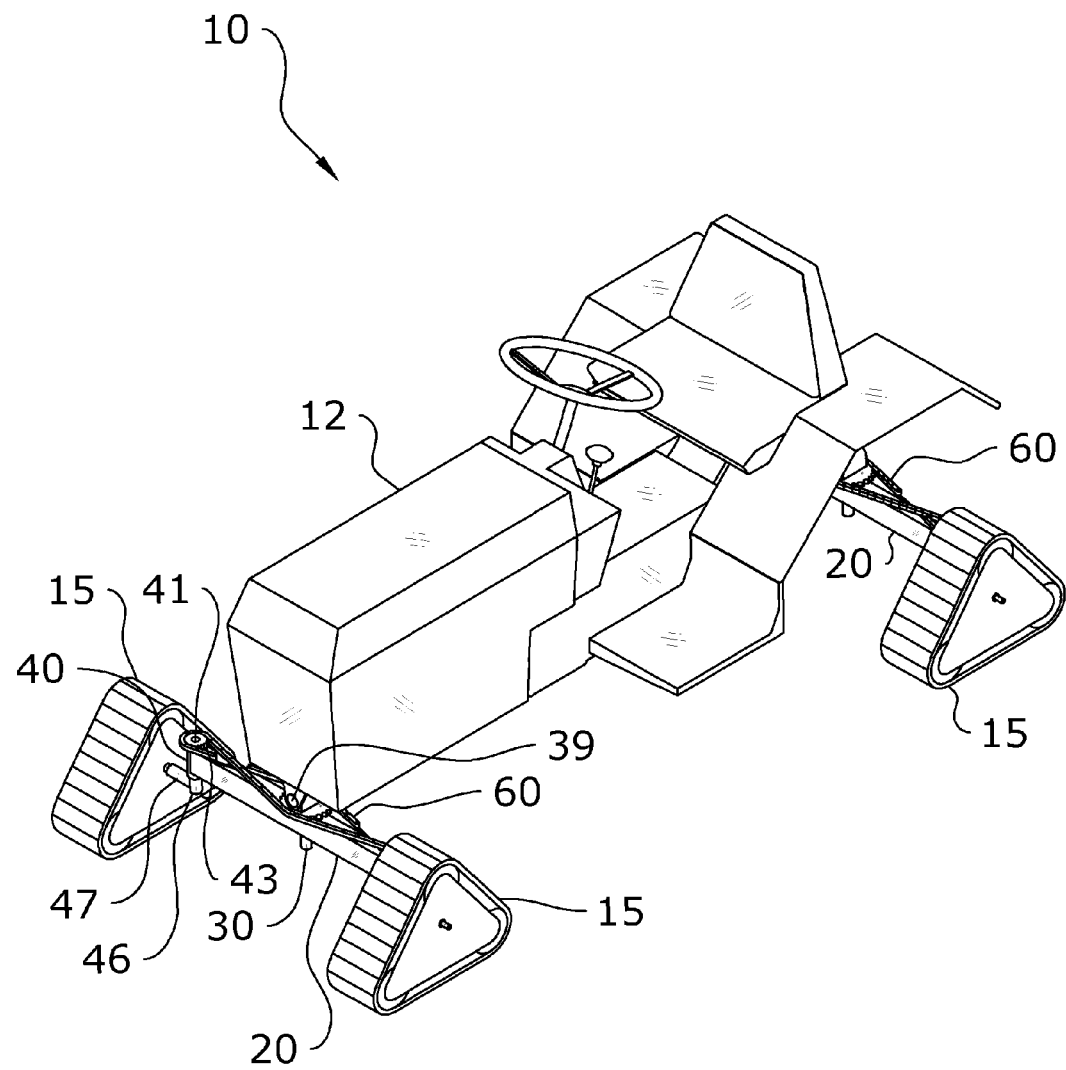
FIG. 6 is an upper perspective view of the sprocket embodiment of the present invention in use on a tractor with tracks.
Figure 7:
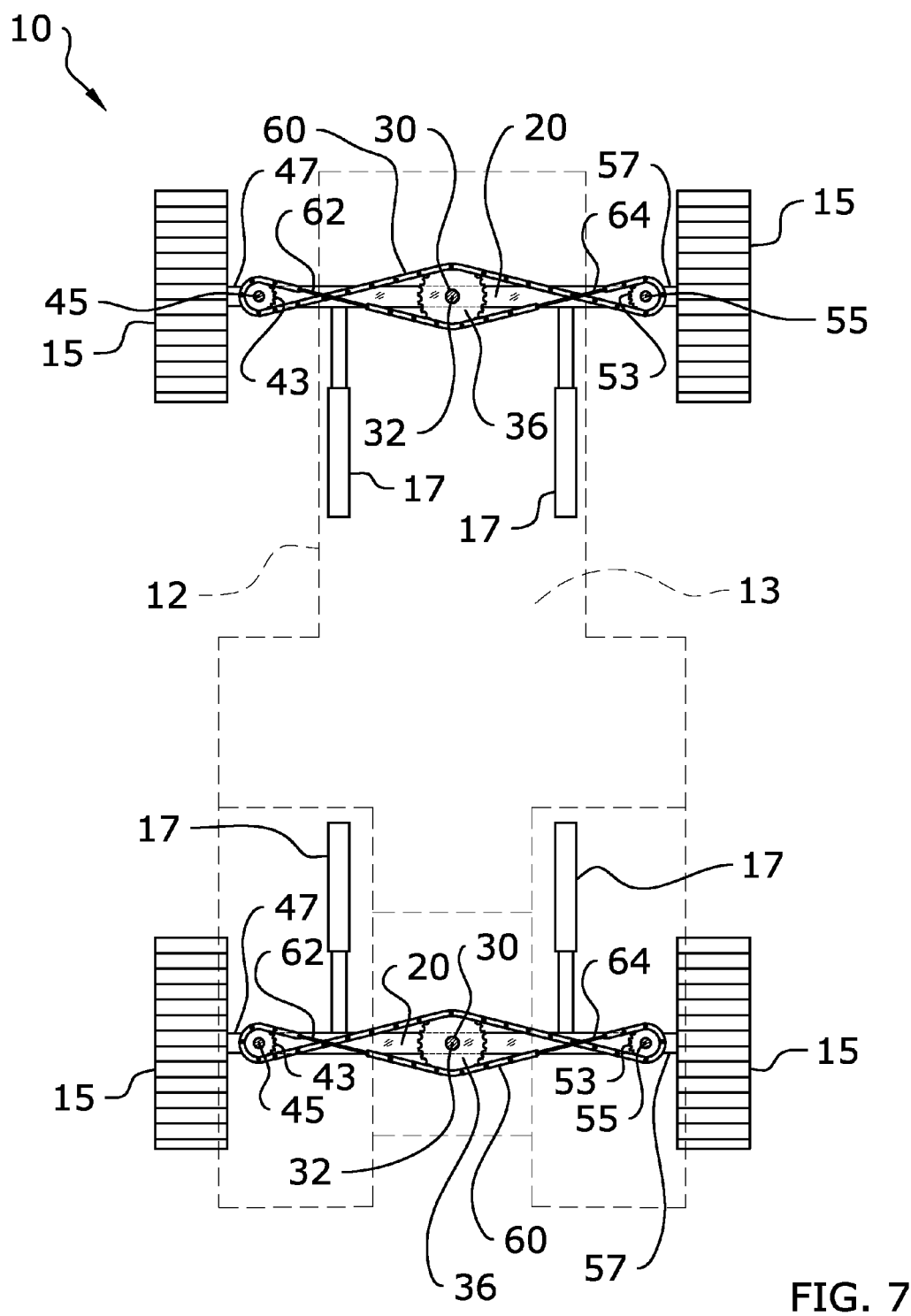
FIG. 7 is a top view of the sprocket embodiment of the present invention with tracks with the support member in a straight orientation.
Figure 8:
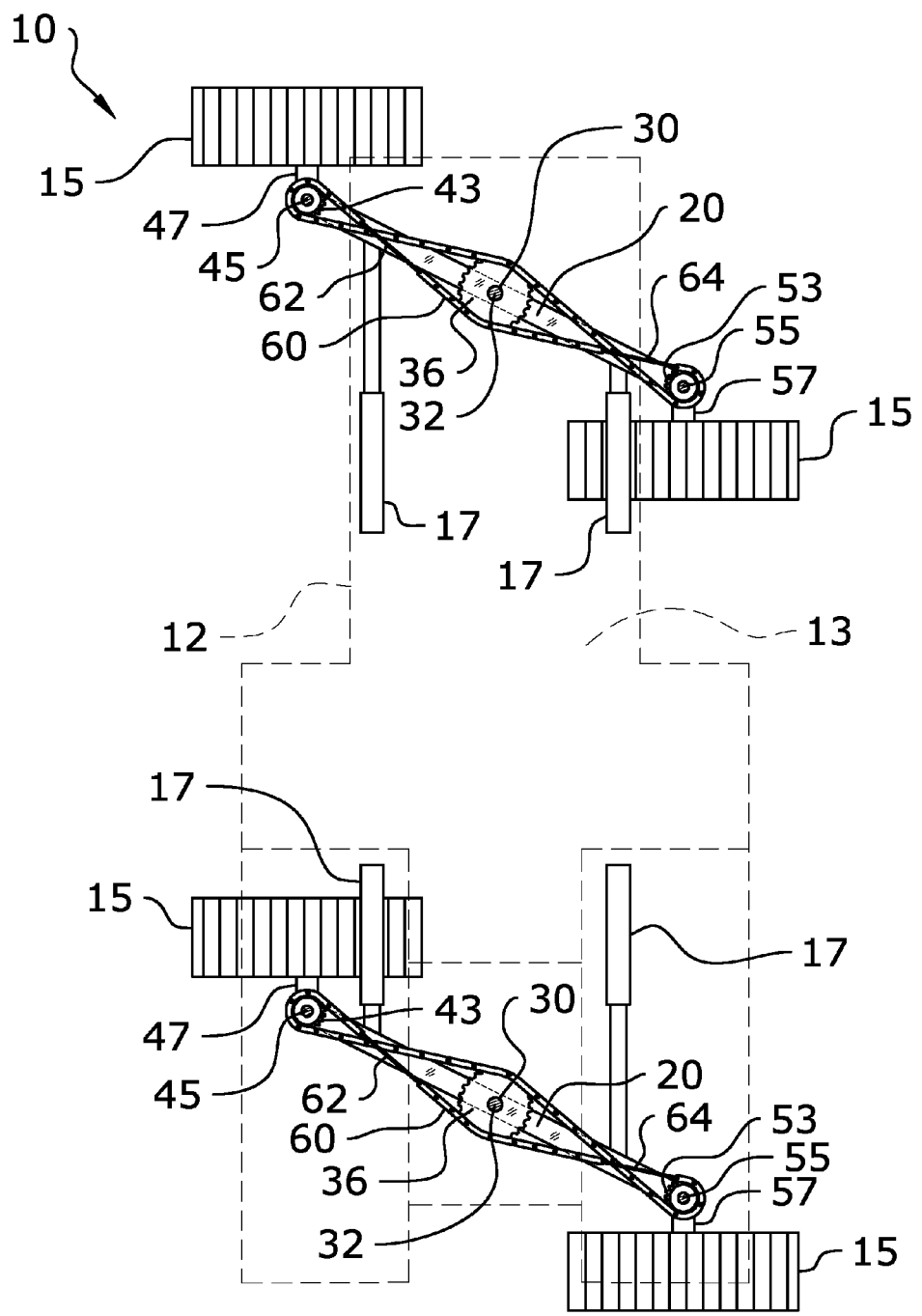
FIG. 8 is a top view of the sprocket embodiment of the present invention with tracks with the support member in a turned orientation.
Figure 9:
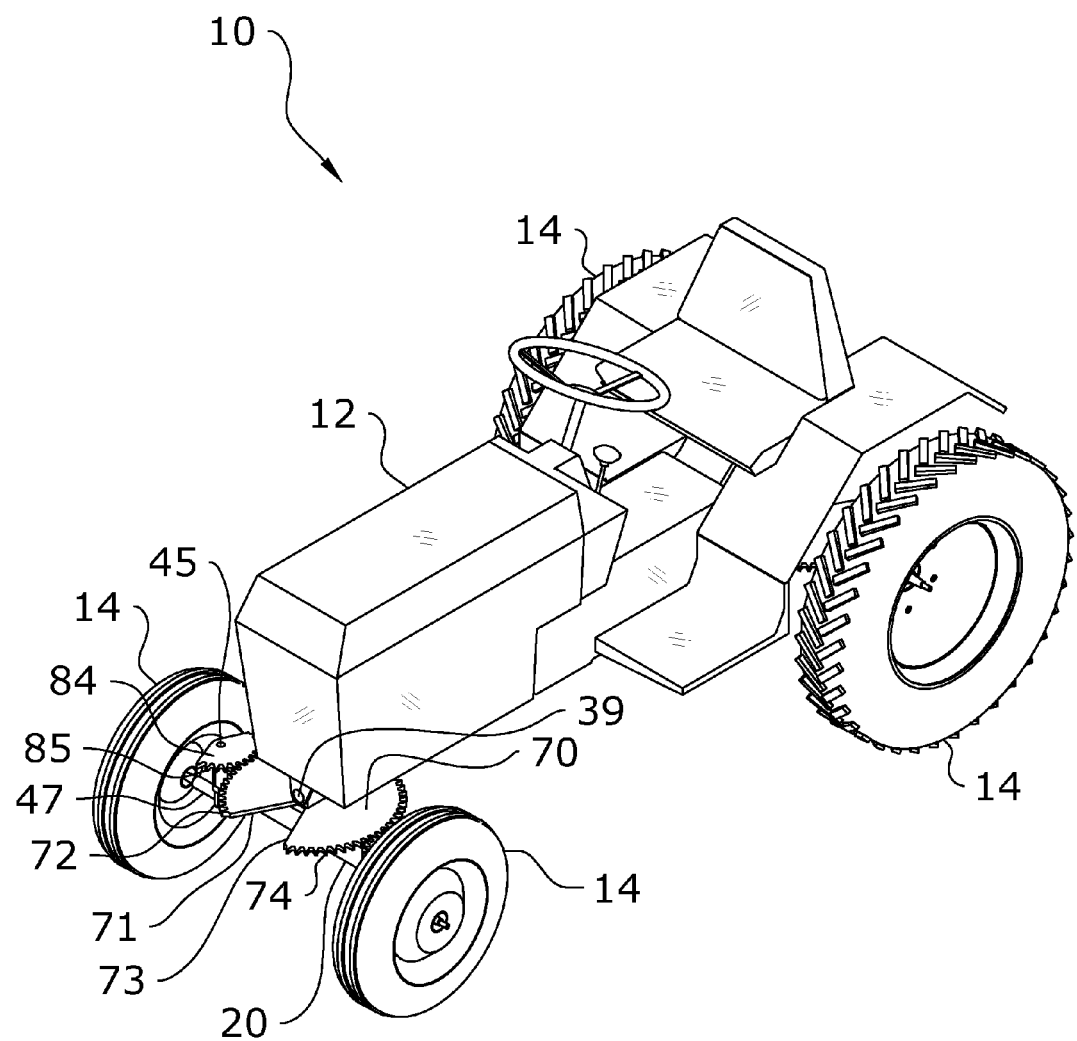
FIG. 9 is an upper perspective view of the gear embodiment of the present invention in use on a tractor with wheels.

Upon initiation of turning motion (such as by hydraulic actuators 17 or the like), the support member 20 will rotate around the fixed post 30 as shown in FIGS. 3 and 5. The connection of the linkage 60 between the first and second outer sprockets 43, 53 and the central sprocket 36 will cause the outer sprockets 43, 53 to be rotated more than the support member 20 itself is rotated. The ratio between the amount of turning motion of the support member 20 and the amount of turning motion of the outer sprockets 43, 53 is determined by the size ratio between the central sprocket 36 and the outer sprockets 43, 53.

As the support member 20 is rotated about the fixed post 30, the linkage 60 will force rotation of the outer sprockets 43, 53. As the first outer sprocket 43 rotates, it will also rotate the first rotator shaft 44. The first mount 47 on the first rotator shaft 44 will be rotated along with the first rotator shaft 44, thus rotating the wheels 14 or track 15 secured to the first mount 47. Similarly, as the second outer sprocket 53 rotates, the second rotator shaft 54 will similarly be rotated. The second mount 57 will thus be rotated along with the second rotator shaft 54 to rotate the wheels 14 or track 15 secured to the second mount 57. Thus, the amount of turning motion applied to the support member 20 is not limiting on the turning motion of the wheels 14 or tracks 15 secured to the first and second mounts 47, 57.

Figure 12:
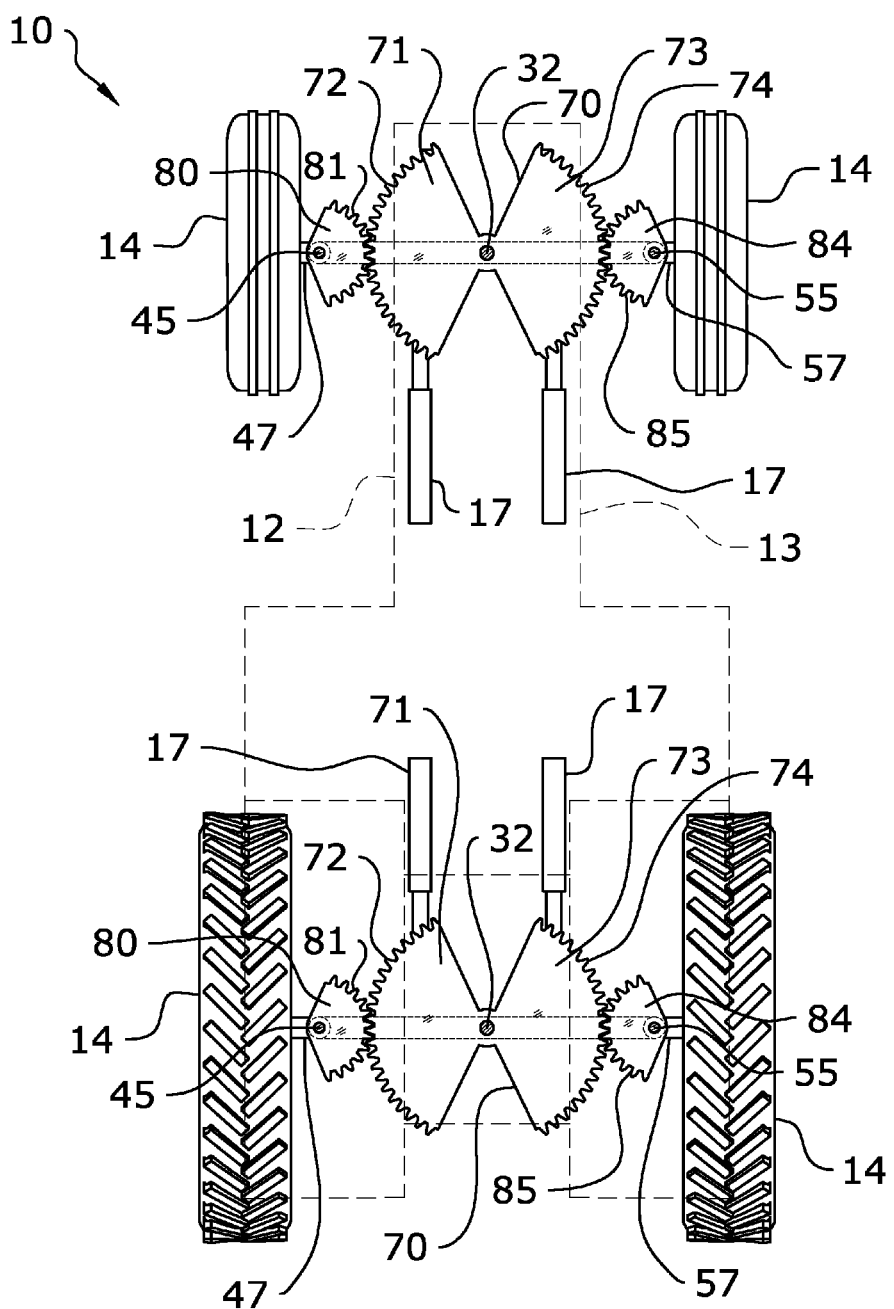
FIG. 12 is a top view of the gear embodiment of the present invention with wheels with the support member in a straight orientation.
Figure 13:
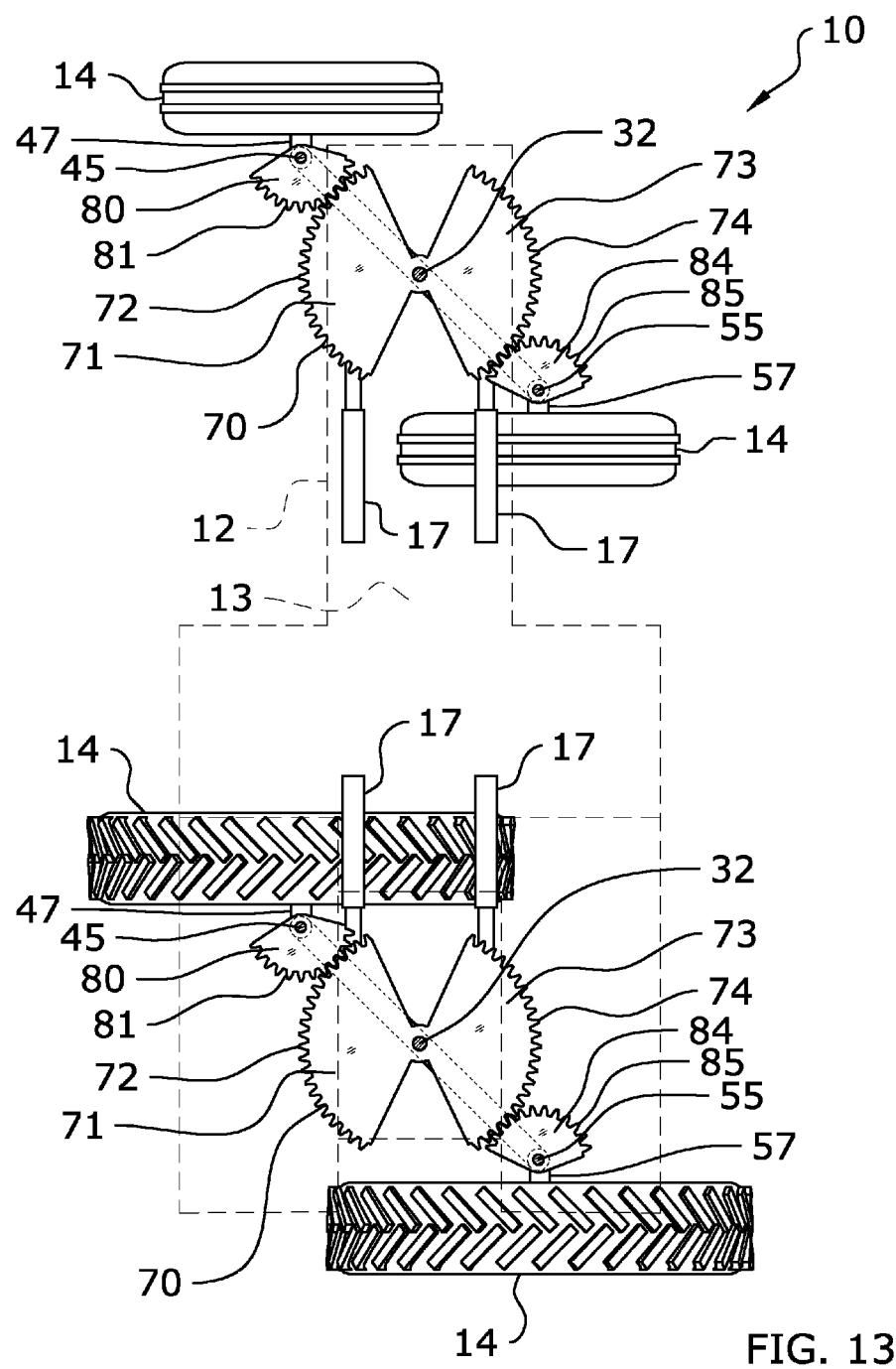
FIG. 13 is a top view of the gear embodiment of the present invention with wheels with the support member in a turned orientation.
Figure 14:
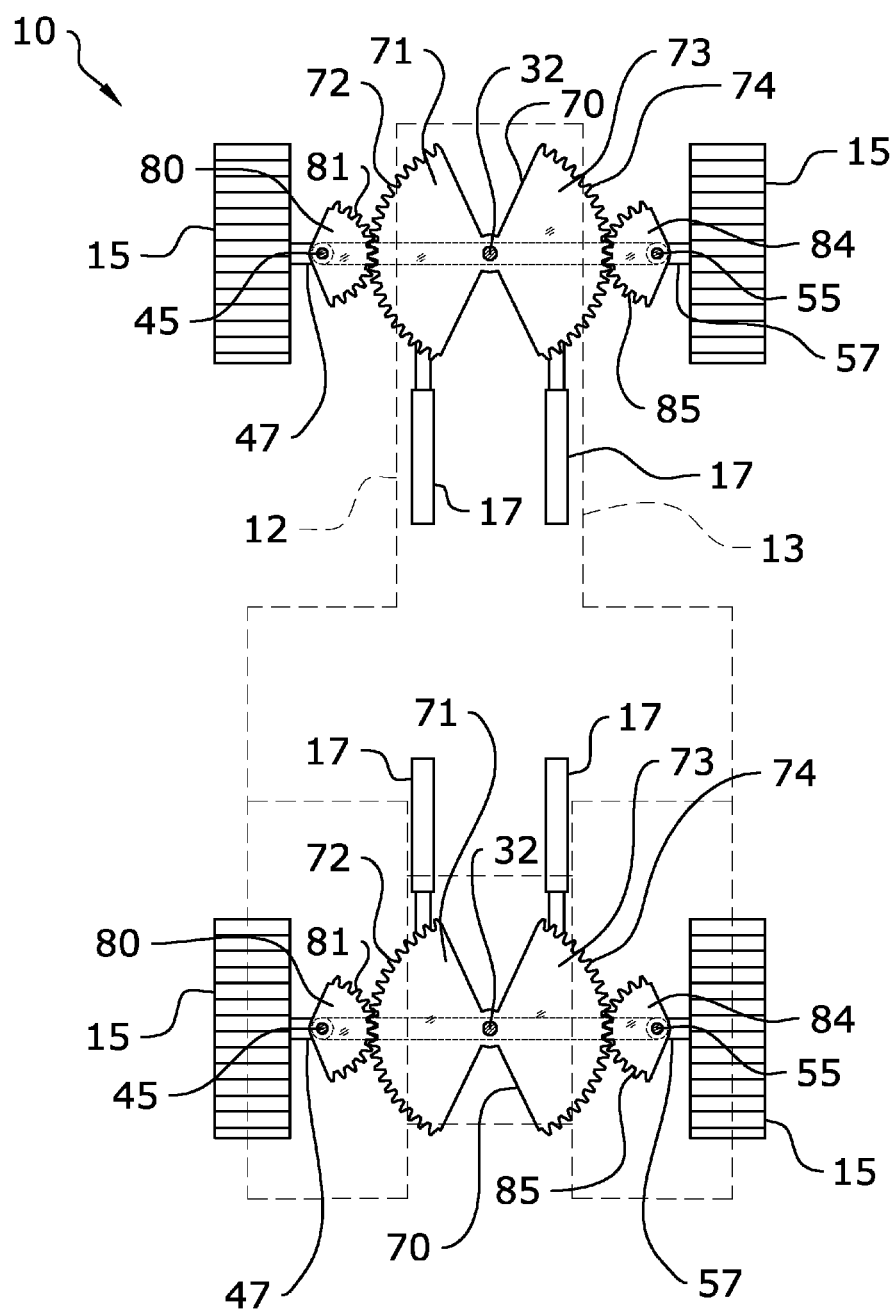
FIG. 14 is a top view of the gear embodiment of the present invention with tracks with the support member in a straight orientation.
Figure 15:
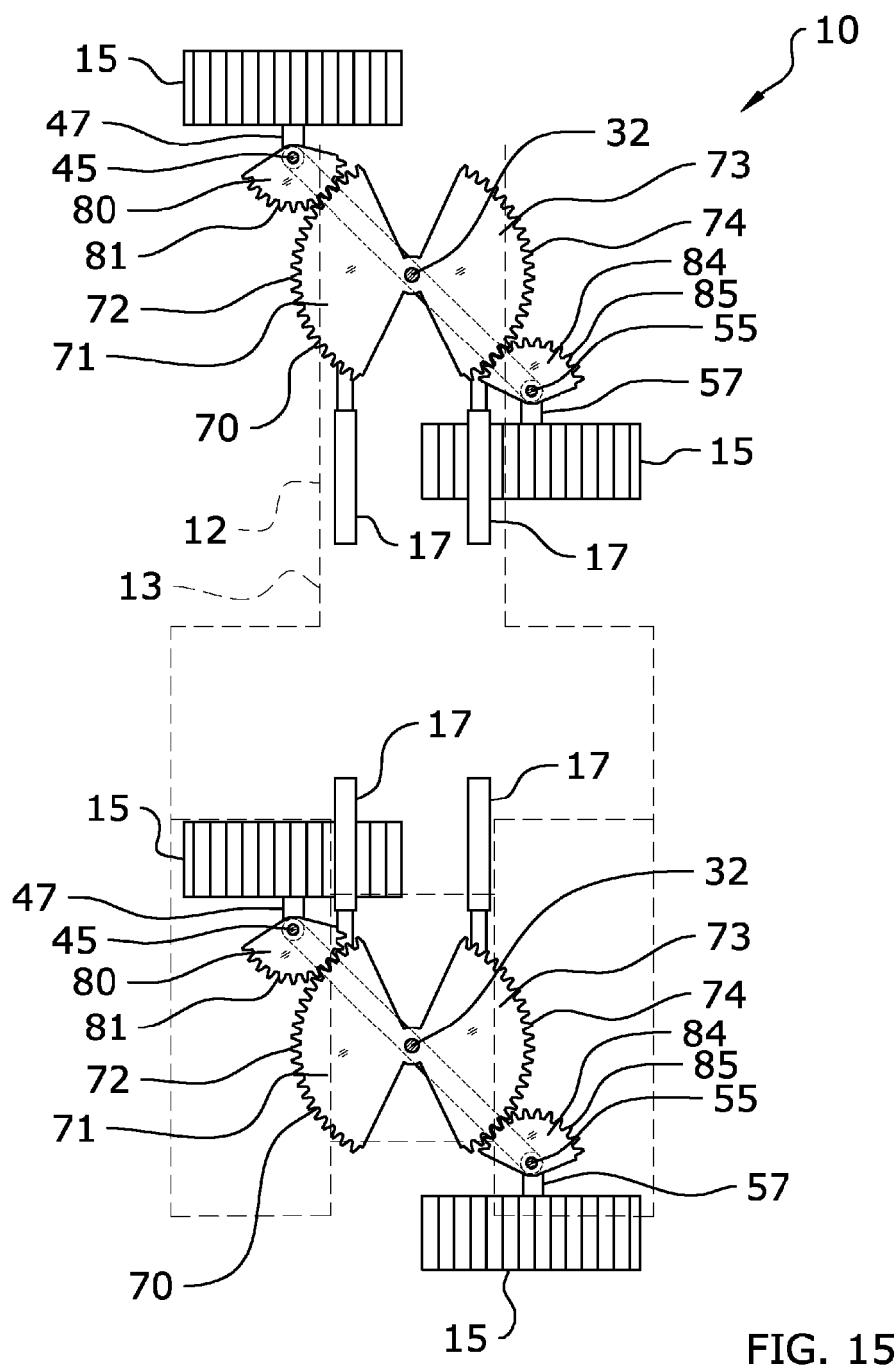
FIG. 15 is a top view of the gear embodiment of the present invention with tracks with the support member in a turned orientation.

FIGS. 10-15 illustrate exemplary operation of a gear embodiment of the present invention. FIGS. 10, 12, and 14 illustrate an exemplary gear embodiment of the present invention in a straight configuration without any turning motion. To turn the wheels 14 or tracks 15, the support member 20 is first rotated or turned in one of two directions about a longitudinal axis. This turning motion may be accomplished by a number of methods known in the art. For exemplary purposes, the figures illustrate hydraulic actuators 17 which are linked between the frame 13 of the vehicle 12 and the support member 20.

Upon initiation of turning motion (such as by hydraulic actuators 17 or the like), the support member 20 will rotate around the fixed post 30 as shown in FIGS. 11 and 13. The connections between the outer gears 80, 84 and the central gear 70 will cause the outer gears 80, 84 to be rotated more than the support member 20 itself is rotated. The ratio between the amount of turning motion of the support member 20 and the amount of turning motion of the outer gears 80, 84 is determined by the size ratio between the central gear 70 and the outer gears 80, 84.

As the support member 20 is rotated about the fixed post 30 as shown in FIG. 11, the first outer gear edge 81 of the first outer gear 80 will follow the first portion gear edge 72 of the first portion 71 of the central gear 70. Similarly, the second outer gear edge 85 of the second outer gear 84 will follow the second portion gear edge 74 of the second portion 73 of the central gear 70. As each of the outer gears 80, 84 rotate, the underlying first and second rotator shafts 44, 54 will similarly be rotated. Rotation of the rotator shafts 44, 54 will cause the mounts 47, 57 to similarly rotate along with the shafts 44, 54. This rotation of the mounts 47, 57 will cause rotation of the wheels 14 or tracks 15 secured to the mounts 47, 57.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A high performance steering system, comprising:
    a support member having a first end;
    a fixed post extending through said support member such that said support member rotates about said fixed post;
    a first outer shaft rotatably connected to said first end of said support member; and
    a force transfer assembly for rotating said first outer shaft with respect to said support member as said support member is rotated about said fixed post, said force transfer assembly comprising:
        a first curved member connected to said fixed post; and
        a second curved member connected to said outer shaft;
        wherein said first curved member is coupled to said second curved member such that a turning force is exerted on said second curved member as said support member rotates about said fixed post, said force transfer assembly amplifying a rotation of said second curved member relative to a rotation of said support member about said fixed post, an amplification amount being based at least in part on a size ratio of said first curved member relative to said second curved member.

2. The high performance steering system of claim 1, further comprising a second outer shaft rotatably connected to a second end of said support member, wherein said force transfer assembly rotates said second outer shaft with respect to said support member as said support member is rotated about said fixed post.

3. The high performance steering system of claim 2, wherein said force transfer assembly comprises a plurality of sprockets and a linkage.

4. The high performance steering system of claim 3, wherein said plurality of sprockets comprises a first outer sprocket, a second outer sprocket, and a central sprocket.

5. The high performance steering system of claim 4, further comprising a central bracket connected to said central sprocket, wherein said central bracket is adapted to connect said support member with a frame of a vehicle.

6. The high performance steering system of claim 4, wherein said central sprocket is at least twice as large as said first outer sprocket and said second outer sprocket.

7. The high performance steering system of claim 4, wherein said first outer sprocket is connected to said first outer shaft and wherein said second outer sprocket is connected to said second outer shaft.

8. The high performance steering system of claim 7, wherein said central sprocket is connected to said fixed post.

9. The high performance steering system of claim 2, further comprising a first mount extending perpendicularly from said first outer shaft and a second mount extending perpendicularly from said second outer shaft.

10. The high performance steering system of claim 2, wherein said force transfer assembly comprises a plurality of gears.

11. The high performance steering system of claim 10, wherein said plurality of gears comprise a central gear, a first outer gear, and a second outer gear.

12. The high performance steering system of claim 11, wherein said central gear comprises a central portion, a first portion extending in a first direction from said central portion, and a second portion extending in a second direction from said central portion.

13. The high performance steering system of claim 12, wherein said first portion of said central gear is comprised of an arc-shape facing toward said first end of said support member and wherein said second portion of said central gear is comprised of an arc-shape facing toward said second end of said support member.

14. The high performance steering system of claim 13, wherein said first portion of said central gear includes a first portion gear edge and wherein said second portion of said central gear includes a second portion gear edge.

15. The high performance steering system of claim 14, wherein said first portion gear edge of said central gear meshes with a first outer gear edge of said first outer gear.

16. The high performance steering system of claim 15, wherein said second portion gear edge of said central gear meshes with a second outer gear edge of said second outer gear.

17. A high performance steering system, comprising:
    a support member having a first end and a second end, wherein said first end of said support member includes a first outer post and wherein said second end of said support member includes a second outer post;
    a fixed post extending through said support member such that said support member rotates about said fixed post;
    a first rotator shaft rotatably extending through said first outer post;
    a first mount extending from said first rotator shaft;
    a second rotator shaft rotatably extending through said second outer post;
    a second mount extending from said second rotator shaft; and
    a force transfer assembly for rotating said first rotator shaft and said second rotator shaft with respect to said support member as said support member is rotated about said fixed post, said force transfer assembly comprising:
        a first curved member connected to said fixed post;
        a second curved member connected to said first rotator shaft; and
        a third curved member connected to said second rotator shaft
        wherein said first curved member is coupled to said second curved member and said third curved member such that a turning force is exerted on said second curved member and said third curved member as said support member rotates about said fixed post, said force transfer assembly amplifying a rotation of said second curved member and said third curved member relative to a rotation of said support member about said fixed post, an amplification amount being based at least in part on a size ratio of said first curved member relative to said second curved member and said third curved member.

18. The high performance steering system of claim 17, wherein said force transfer assembly comprises a first outer sprocket connected to said first rotator shaft, a second outer sprocket connected to said second rotator shaft, and a central sprocket connected to said fixed post.

19. The high performance steering system of claim 18, wherein said force transfer assembly further comprises a linkage connected between said first outer sprocket, said second outer sprocket, and said central sprocket.

20. The high performance steering system of claim 17, wherein said force transfer assembly comprises a first outer gear connected to said first rotator shaft, a second outer gear connected to said second rotator shaft, and a central gear connected to said fixed post.

21. The high performance steering system of claim 1 further comprising:
a second support member;
a fixed post extending through said second support member;
a second outer shaft rotatably connected to a first end of said second support member; and
a second force transfer assembly for rotating said second outer shaft with respect to said support second member as said support member is rotated about said fixed post, said second force transfer assembly comprising:
a third curved member connected to said fixed post; and
a fourth curved member connected to said second outer shaft;
wherein said third curved member is coupled to said fourth curved member such that a turning force is exerted on said fourth curved member as said second support member rotates about said fixed post, said second force transfer assembly amplifying a rotation of said fourth curved member relative to a rotation of said second support member about said fixed post, an amplification amount being based at least in part on a size ratio of said third curved member relative to said fourth curved member.

22. The high performance steering system of claim 21 wherein the force transfer assembly and the second force transfer assembly each comprise a plurality of sprockets and a linkage.

23. The high performance steering system of claim 21 wherein the force transfer assembly and the second force transfer assembly each comprise a plurality of gears.

24. The high performance steering system of claim 21 wherein the force transfer assembly and the second force transfer assembly each comprise a plurality of pulleys and a cable.

\* \* \* \* \*